(12) United States Patent
Chang

(10) Patent No.: US 6,405,288 B1
(45) Date of Patent: Jun. 11, 2002

(54) METHOD AND SYSTEM FOR CONTROLLING THE MEMORY ACCESS OPERATION BY CENTRAL PROCESSING UNIT IN A COMPUTER SYSTEM

(75) Inventor: Nai-Shung Chang, Taipei Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/371,700

(22) Filed: Aug. 10, 1999

(30) Foreign Application Priority Data

Mar. 2, 1999 (TW) .......................................... 88103134

(51) Int. Cl.[7] .............................................. G06F 13/00
(52) U.S. Cl. ........................ 711/143; 711/118; 711/143; 711/146; 711/154; 711/163; 711/167
(58) Field of Search ................................. 711/167, 164, 711/146, 154, 118, 119, 120, 121, 143

(56) References Cited

U.S. PATENT DOCUMENTS

| | | | | |
|---|---|---|---|---|
| 5,428,725 A | * | 6/1995 | Sugai et al. ................. | 345/436 |
| 5,490,261 A | * | 2/1996 | Bean et al. .................. | 711/121 |
| 5,572,703 A | * | 11/1996 | MacWilliams et al. ...... | 711/146 |
| 5,813,036 A | * | 5/1997 | Ghosh et al. ................ | 711/146 |
| 5,960,459 A | * | 8/1998 | Thome et al. ............... | 711/154 |
| 5,963,721 A | * | 10/1999 | Shiell et al. ................. | 710/129 |

* cited by examiner

Primary Examiner—Do Hyun Yoo
Assistant Examiner—Jasmine Song
(74) Attorney, Agent, or Firm—J.C. Patents

(57) ABSTRACT

A memory access control method and system is provided for use on a computer system to control the memory access operation by a central processing unit (CPU) to a memory unit in a more efficient manner. This memory access control method and system is characterized in the capability of switching the memory access operation between a waiting mode and a non-waiting mode based on the current L1 write-back condition of the read requests from the CPU. In the waiting mode, the memory unit responds to each read request in such a manner as to wait until the L1 write-back signal of the read request is issued and then either perform a read operation for the current read request if the L1 write-back signal indicates a cache miss, or perform a cache write-back operation if the L1 write-back signal indicates a cache hit. In the non-waiting mode, the memory unit responds to each read request in such a manner that it will always promptly perform a read operation for the current read request without waiting until the CPU issues the L1 write-back signal of the current read request, and in the event that the subsequently received L1 write-back signal of the read request indicates a cache hit, promptly abandon the currently retrieved data from the memory unit and then performing a cache write-back operation.

7 Claims, 19 Drawing Sheets

METHOD AND SYSTEM FOR CONTROLLING THE MEMORY ACCESS OPERATION BY CENTRAL PROCESSING UNIT IN A COMPUTER SYSTEM

CROSS-REFERENCE TO RELATED APPLICATION

This application claims the priority benefit of Taiwan application serial no. 88103134, filed Mar. 2, 1999, the full disclosure of which is incorporated herein by reference.

BACKGROUND OF THE INVENTION

1. Field of the Invention

This invention relates to a computer memory access technique, and more particularly, to a memory access control method and system for use on a computer system to control the memory access operation by a central processing unit (CPU) to a memory unit in a more efficient manner through the means of switching the memory access operation between a waiting mode and a non-waiting mode based on L1 write-back read requests from the CPU.

2. Description of Related Art

In this information age, computers have become an indispensable data processing tool in all works of life. In the use of computers, performance is a primary concern. Many factors can affect the performance of a computer system, including the speed of the CPU, the type of the primary memory being used, efficiency of memory access control, and so forth. Presently, dynamic random-access memory (DRAM) is widely used as the primary memory of most computer systems. Conventional memory access methods that can help boost the computer performance include, for example, the Fast Page Mode (FPM) method and the Extended Data Out (EDO) method. Moreover, a new type of DRAM, called synchronized DRAM (SDRAM), allows fast access speed to the data stored therein.

One conventional solution to enhance memory access performance by CPU is to integrate a fast-speed memory, customarily referred as cache memory, in the CPU. When the CPU makes a request to access data, the CPU may want to write the data in the cache memory back to the memory unit. In this situation, according to the CPU operational method, the CPU issues an L1 write-back signal at several clock cycles later after the read request is made by the CPU. Conventional memory access control systems typically operate in such a manner that, for each read request from the CPU, the control interface usually waits to ensure whether the L1 write-back signal is issued or not, then performs the actual access operations, such as read or write-back by sending out all related instructions to the memory unit. The CPU therefore reads data from the memory unit or writes data back to the memory unit.

It can be learned from the foregoing description that one drawback to the prior art is that there always exists a wait state for the memory access control system to know whether the L1 write-back signal of the current read request is included or not and then actually perform the access operation on the memory unit. Since each wait state is several clock cycles long, it causes the memory access operation to be quite inefficient. The overall system performance of the computer system is therefore poor and there is still room for improvement. In a typical computer system, statistics shows that the overall memory access operation performed by a CPU includes about 60% of read operation, 15% of cache write-back operation, and 25% of write operation. Therefore, the overall system performance of the computer system can be enhanced by solely increasing the speed of the read operation. The prior art, however, is low in read operation since it would frequently stay in wait states for L1 write-back signals.

SUMMARY OF THE INVENTION

It is therefore an objective of the present invention to provide an improved memory access control method and system for use on a computer system, which can help increase the speed of the read operation by the CPU through the means of transferring each read request promptly to the memory unit without waiting until the L1 write-back signal of the read request is issued, so that the overall system performance of the computer system can be enhanced.

It is another objective of the present invention to provide an improved memory access control method and system for use on a computer system, which is capable of switching the memory access operation between a waiting mode and a non-waiting mode based on the current L1 write-back condition of the read requests from the CPU. In the waiting mode, each read request is transferred to the memory unit until the L1 write-back signal thereof is issued; and in non-waiting mode, the read request is promptly transferred to the memory unit without waiting until its L1 write-back signal is issued.

In accordance with the foregoing and other objectives of the present invention, an improved memory access control method and system is provided for use on a computer system to control the memory access operation by the CPU to the memory unit in a more efficient manner.

The memory access control method and system is provided for use on a computer system having a CPU and a memory unit for controlling the memory access operation by the CPU to the memory unit. As the CPU issues a read request a following L1 write-back signal, the system is automatically switched to a wati mode, which needs to wait to see if an L1 write-back signal follows or not. As the system is operated in the wait mode, if a certain series of read requests without a following L1 write-back signal, the system is automatically switched to a non-wait mode. In the non-wait mode, the system can perform the CPU request after the read request is issued without a need to wait to see if an L1 write-back signal follows or not.

The memory access control system of the invention is composed of a CPU interface, a memory control unit, and a mode-switching unit.

The CPU interface is coupled to the CPU, which is capable of being selectively switched to operate between a waiting mode and a non-waiting mode; in the waiting mode, the CPU interface responding to each read request from the CPU in such a manner as to wait until the L1 write-back signal of the current read request is received and then issue a corresponding internal read-request signal if the L1 write-back signal indicates a cache miss, or a corresponding internal cache write-back request signal if the L1 write-back signal indicates a cache hit; and in the non-waiting mode, the CPU interface responding to each read request from the CPU in such a manner that the CPU interface will promptly issue the corresponding internal read-request signal without waiting until the CPU issues the L1 write-back signal of the current read request, and in the event that the subsequently issued L1 write-back signal of the current read request indicates a cache hit, promptly issue a read-stop signal for the current read request.

The memory control unit is coupled between the CPU interface and the memory unit, which is capable of performing a read operation on the memory unit in response to each internal read-request signal from the CPU interface, and further in response to the read-stop signal, is capable of abandoning the currently retrieved data from the memory unit demanded by the current read request and then performing a cache write-back operation to write back the subsequent output cache data from the CPU back into the memory unit.

Furthermore, the mode-switching unit is coupled between the CPU interface and the CPU, which is initially set to switch the CPU interface to operate in the waiting mode, and is further capable of detecting whether each read request from the CPU is a cache hit or a cache miss and counting the number of consecutive cache-miss read requests to thereby switch the CPU interface to the non-waiting mode when the count reaches a pre-set threshold.

The memory access control method comprises the procedural steps of: (1) performing a mode-switching process to switch the memory access operation between a waiting mode and a non-waiting mode; the memory access operation being switched to the waiting mode during the time when the currently issued read requests are each a cache hit, and to the waiting mode when the currently issued read request are each a cache miss; (2) in the waiting mode, responding to each read request from the CPU until the CPU issues the L1 write-back signal of the current read request; and (3) in the non-waiting mode, promptly responding to each read request from the CPU without waiting until the CPU issues the L1 write-back signal of the current read request.

The mode-switching process includes the substeps of: (1-1) initially setting the memory access operation to the waiting mode; and (1-2) if the number of consecutive cache-miss read requests from the CPU reaches a preset threshold, switching the memory access operation to the non-waiting mode, and subsequently, if any cache-hit read request is issued from the CPU, promptly switching the memory access operation back to the waiting mode.

In the waiting mode, the responding to each read request from the CPU includes the substeps of: (2-1) waiting until the L1 write-back signal of the current read request is issued; (2-2) checking whether the L1 write-back signal of the current read request indicates a cache hit or a cache miss; (2-3) performing a read operation for the current read request if the L1 write-back signal of the current read request indicates a cache miss, and (2-4) performing a cache write-back operation if the L1 write-back signal of the current read request indicates a cache hit.

Moreover, in the non-waiting mode, the responding to each read request from the CPU includes the substeps of: (3-1) promptly performing a read operation for the current read request without waiting until the CPU issues the L1 write-back signal of the current read request; and (3-2) in the event that the subsequently issued L1 write-back signal of the current read request indicates a cache hit, promptly issuing a read-stop signal for the current read request to abandon the currently retrieved data from the memory unit, and then performing a cache write-back operation to write back the subsequent output cache data from the CPU into the memory unit.

The foregoing memory access control method and system of the invention is characterized in the capability of switching the memory access operation between a waiting mode and a non-waiting mode. From practical implementation and testing, it can be learned that the overall memory access performance can be increased by switching between the waiting mode and the non-waiting mode based on the current L1 write-back condition of the read requests from the CPU. This further helps increase the overall system performance of the computer system.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
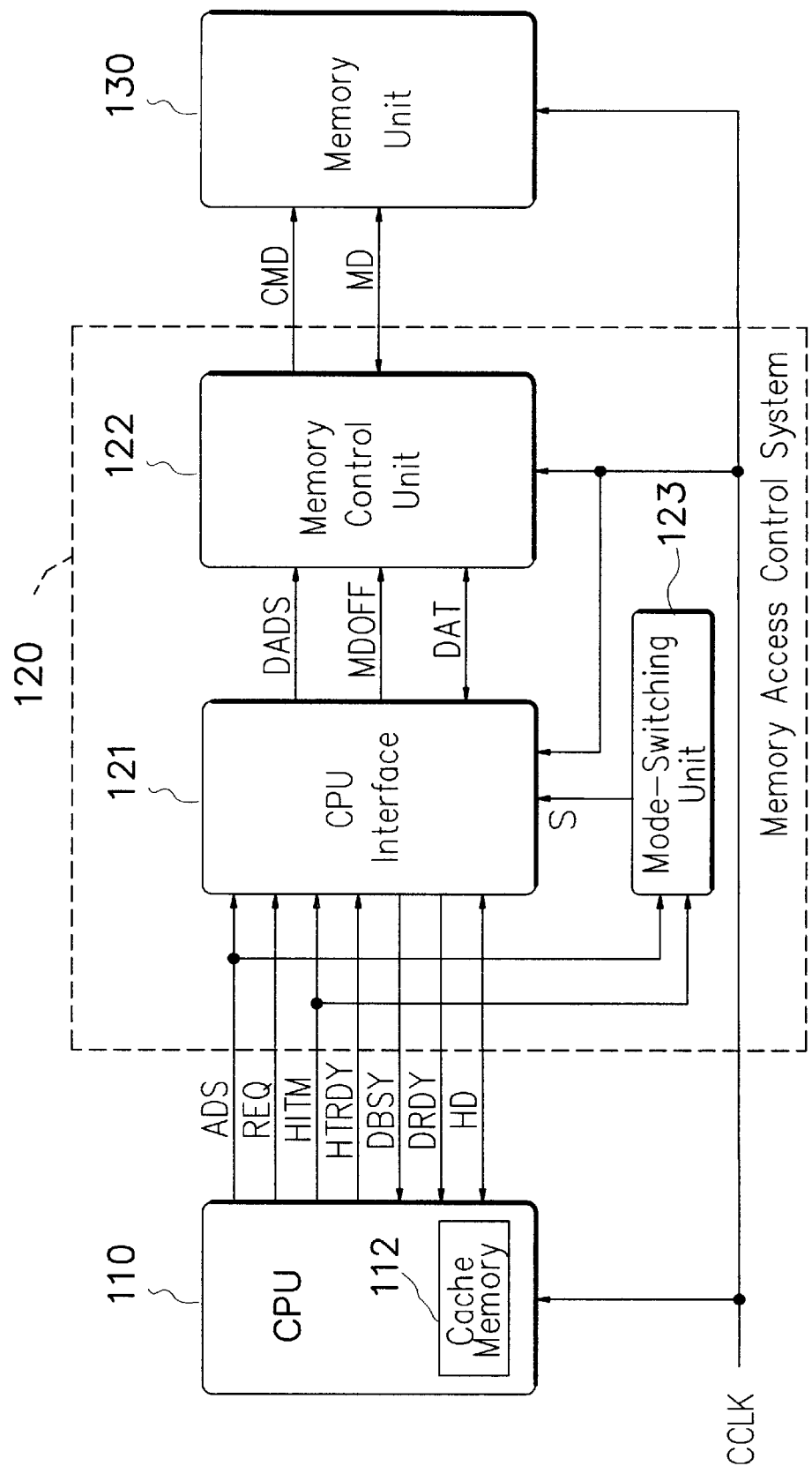
FIG. 1 is a schematic block diagram of the method and system according to the invention for controlling the memory access operation by a CPU to a memory unit.

FIG. 1 is a schematic block diagram of the memory access control method and system according to the invention, as the part enclosed in a dashed box indicated by the reference numeral 120, which is designed to control the memory access operation by a CPU 110 to a memory unit 130.

The memory access control system 120 of the invention is coupled between the CPU 110 and the memory unit 130 and is composed of a CPU interface 121, a memory control unit 122, and a mode-switching unit 123. The CPU 110 further includes a cache memory 112. The CPU 110 can be, for example, a Pentium II CPU from the Intel Corporation of U.S.A., while the memory unit 130 can be, for example, an SDRAM.

The CPU 110 and the CPU interface 121 are interconnected via a number of data lines ADS, REQ, HITM, HTRDY, DBSY, DRDY, and HD; the CPU interface 121 and the memory control unit 122 are interconnected via three data lines DADS, MDOFF, and DAT; and the memory control unit 122 and the memory unit 130 are interconnected via two data lines CMD and MD. Moreover, the mode-switching unit 123 has two input ports connected respectively to the ADS and the HITM data lines between the CPU 110 and the CPU interface 121, and an output port S connected to the CPU interface 121.

The CPU 110 can gain access to the memory unit 130 under control of the memory access control system 120. The access operation can be either read, cache write-back, or write. When the CPU 110 wants to gain access to the memory unit 130, it issues a series of access requests to the CPU interface 121. During write operation, the memory control unit 122 is used to control the writing of the output data from the CPU 110 into the memory unit 130; and during read operation, the memory control unit 122 controls the retrieval of the CPU-requested data from the memory unit 130 and then transfers the retrieved data via the CPU interface 121 to the CPU 110. It is a characteristic feature of the invention that, during the memory access operation, the mode-switching unit 123 is capable of detecting the signal states of the ADS and HITM data lines to thereby selectively switch the CPU interface 121 to operate between a waiting mode and a non-waiting mode. Details of this will be described later in this specification.

In the system of FIG. 1, all the units are driven by a common clock signal CCLK. The CPU 110 and the CPU interface 121 use the data lines ADS, REQ, HITM, HTRDY, DBSY, DRDY, and HD for the data communication therebetween. It is to be noted that, although in FIG. 1 each data line is shown as a single line, it can be in practice a data bus consisting of a number of lines. For example, in the case of the CPU 110 being a 64-bit CPU, the HD data line is a 64-line data bus. Moreover, in the following preferred embodiment, the designation of LOW-voltage logic state and HIGH-voltage logic state to a certain signal is an alterable design choice and not intended to limit the scope of the invention.

Since the spirit and scope of the invention is directed to an improvement on the performance of the read operation by the CPU 110 to the memory unit 130, the following description will be directed solely to the manner of the read operation carried out by the memory access control system 120 in accordance with the invention. When the CPU 110 wants to gain access to the memory unit 130, it puts the ADS data line at LOW-voltage logic state, and whether the access operation is write or read is indicated by the logic voltage state of the REQ data line. Moreover, whether each read request is a hit or a miss to the cache memory 112 is indicated by an L1 write-back signal issued from the CPU 110 over the HITM data line. For instance, if the current read request is a hit, the CPU 110 will put the HITM data line at LOW-voltage logic state, which indicates that the cache data in the cache memory 112 have been updated and are to be written back to the memory unit 130; and whereas, if a miss, the CPU 110 will put the HITM data line at HIGH-voltage logic state. In the case of a hit, a cache write-back operation will be performed to write the output cache data from the CPU 110, which are transferred via the HTRDY data line, back into the memory unit 130. When the DRDY and DBSY data lines are both put at LOW-voltage logic state, it indicates that the CPU interface 121 wants to transfer data over the HD data line to the CPU 110.

Inside the memory access control system 120, the CPU interface 121 and the memory control unit 122 use the DADS, MDOFF, and DAT data lines for the internal data communication therebetween. The DADS signal is a converted version of the ADS signal from the CPU 110. When the DADS data line is put at LOW-voltage logic state, it indicates that the CPU interface 121 wants to transfer an internal access-request signal to the memory control unit 122. The internal access-request signal can either be an internal read-request signal or an internal write-request signal. However, since the sprite and scope of the invention is directed solely to read operation, only internal read-request signals will be discussed hereinunder in this specification. The MDOFF data line is used to transfer a read-stop signal issued by the CPU interface 121 to the memory control unit 122 in response to an L1 write-back signal indicative of a cache hit by the current read request. The read-stop signal is used to command the memory control unit 122 to stop the read operation for the current read request and abandon the currently retrieved data from the memory unit 130 so as to instead perform a cache write-back operation to write the output cache data from the cache memory 112 in the CPU 110 back into the memory unit 130. The DAT data line is used to transfer the data from the CPU 110 that are to be written into the memory unit 130, or the retrieved data from the memory unit 130 that are to be transferred from the memory control unit 122 via the CPU interface 121 to the CPU 110.

It is a characteristic feature of the invention that the CPU interface 121 is designed 20 to operate between two operation modes: a waiting (first) mode and a non-waiting (second) mode. In the waiting mode, the CPU interface 121 will, in response to each read request from the CPU 110, wait until the CPU 110 issues the L1 write-back signal of the read request (no matter the L1 write-back signal indicates a cache hit or a cache miss) and then issue the corresponding internal read-request signal to the memory control unit 122; whereas, in the non-waiting mode, the CPU interface 121 will promptly issue the corresponding internal read-request signal to the memory control unit 122 in response to each read request from the CPU 110 without waiting until the CPU 110 issues the L1 write-back signal of the current read request. Typically, the CPU 110 will issue the L1 write-back signal of each read request in several clock cycles after the read request is issued; and in the event of a cache hit, the memory access operation will further involve a cache write-back operation. Therefore, the CPU interface 121 is designed to be switched to the waiting mode when it is assumed that each of the currently and subsequently received read requests is a cache hit, and to the non-waiting mode when it is assumed that each of the currently and subsequently received read requests is a cache miss. By eliminating the unnecessary waiting states for the L1 write-back signals of those read requests that later turn out to be a cache miss, the invention can undoubtedly help increase the performance of the read operation by the CPU 110 to the memory unit 130.

During operation of the computer system, the CPU 110 issues successively a number of read requests to the memory unit 130 to demand for specific blocks of data stored in the memory unit 130. Typically, the CPU 110 would operate in such a manner as to issue a consecutive series of cache-hit read requests during a certain period, and then another consecutive series of cache-miss read requests during another period. Accordingly, the mode-switching unit 123 is designed to switch the CPU interface 121 to operate between the waiting mode and the non-waiting mode based on the current L1 write-back condition of the read requests from the CPU 110. When it is assumed that each of the currently and subsequently received read requests from the CPU 110 is a cache hit, the CPU interface 121 is switched to the waiting mode; and whereas, when it is assumed that each of the currently and subsequently received read requests from the CPU 110 is a cache miss, the CPU interface 121 is switched to the non-waiting mode. The mode-switching unit 123 can detect and count the number of consecutive cache-miss read requests from the CPU 110; and if the count reaches a preset threshold, for example 200, the mode-switching unit 123 then switches the CPU interface 121 to operate in the non-waiting mode. As shown in FIG. 1, the mode-switching unit 123 detects the signal states on the ADS and HITM data lines to thereby count the number of consecutive cache-miss read requests from the CPU 110. When the count reaches the preset threshold, the mode-switching unit 123 issues a mode-switching signal via its output port S to the CPU interface 121 to switch the CPU interface 121 to operate in the non-waiting mode.

Furthermore, the memory control unit 122 and the memory unit 130 use the CMD and MD data lines for the data communication therebetween. The CMD data line is used to transfer various access control signals to the memory unit 130 for different access operations. These access control signals include a precharge-enable signal, an activate-enable signal, a read-enable signal, and a write-enable signal. The MD data line is used to transfer the data that are to be written into the memory unit 130 or the retrieved data from the memory unit 130.

Figure 2:
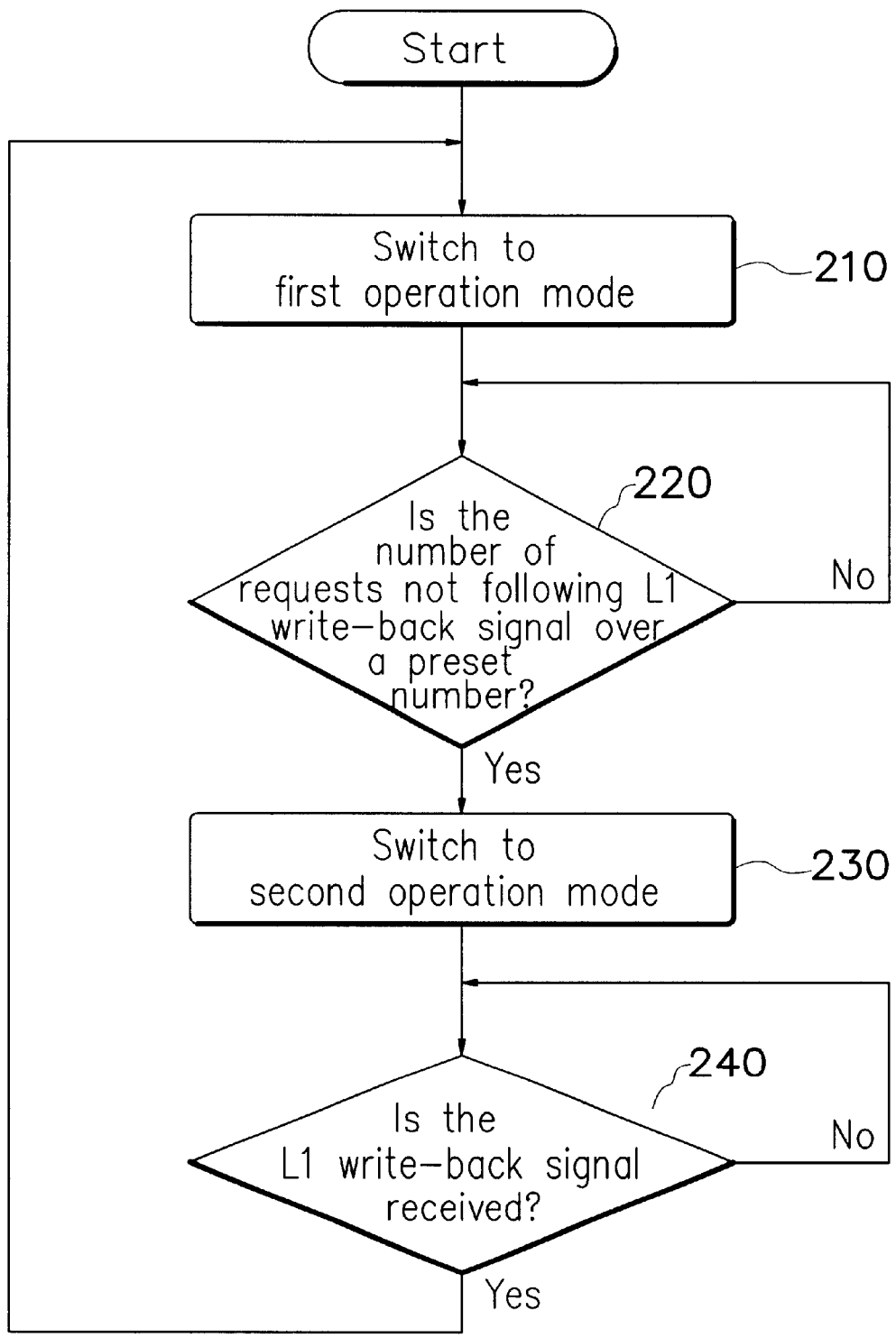
FIG. 2 is a flow diagram of the procedural steps carried out by the mode-switching unit utilized in the memory access control system of the invention shown in FIG. 1.
Figure 3A:
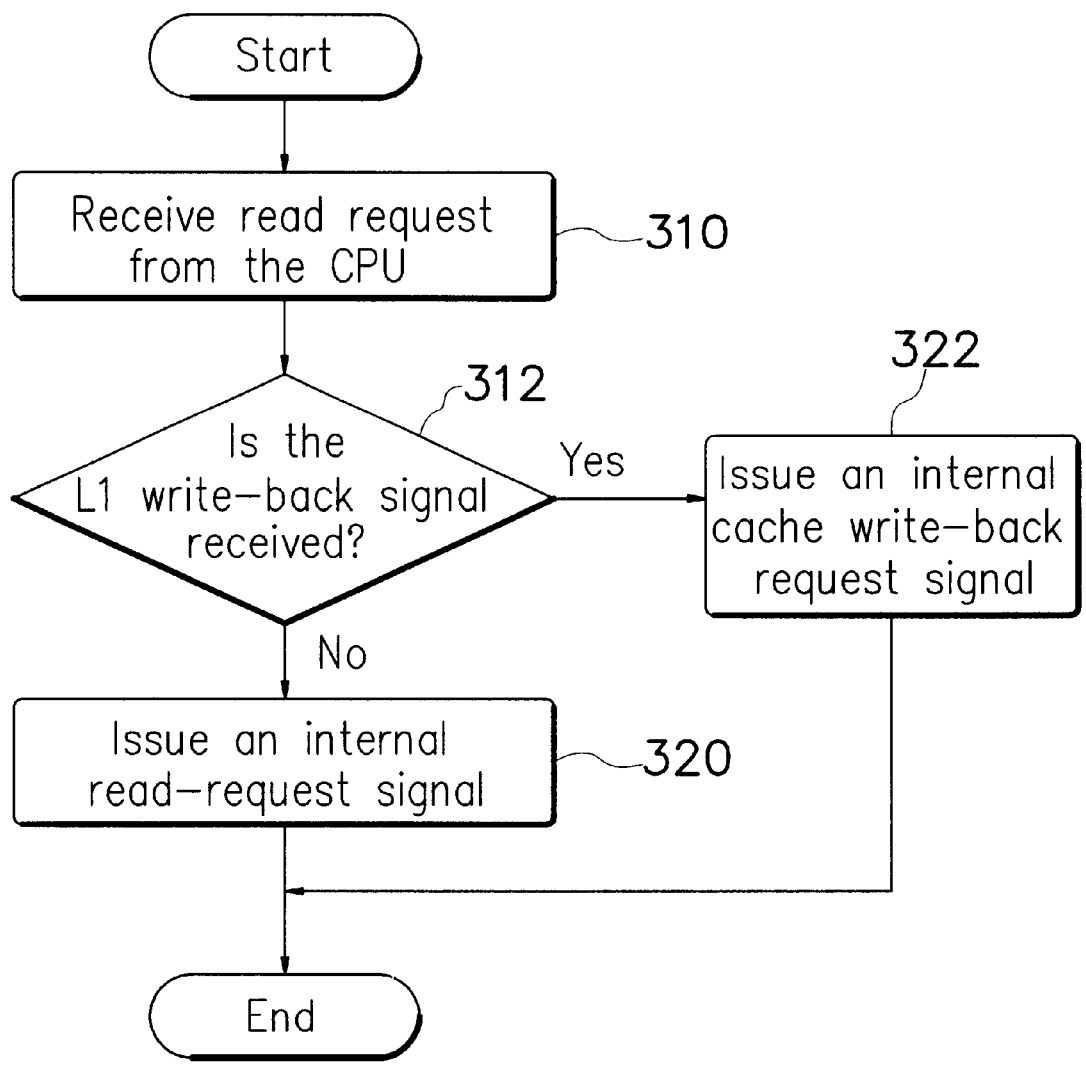
FIG. 3A is a flow diagram of the procedural steps carried out by the CPU interface utilized in the memory access control system of the invention shown in FIG. 1 when it is operating in the waiting mode.
Figure 3B:
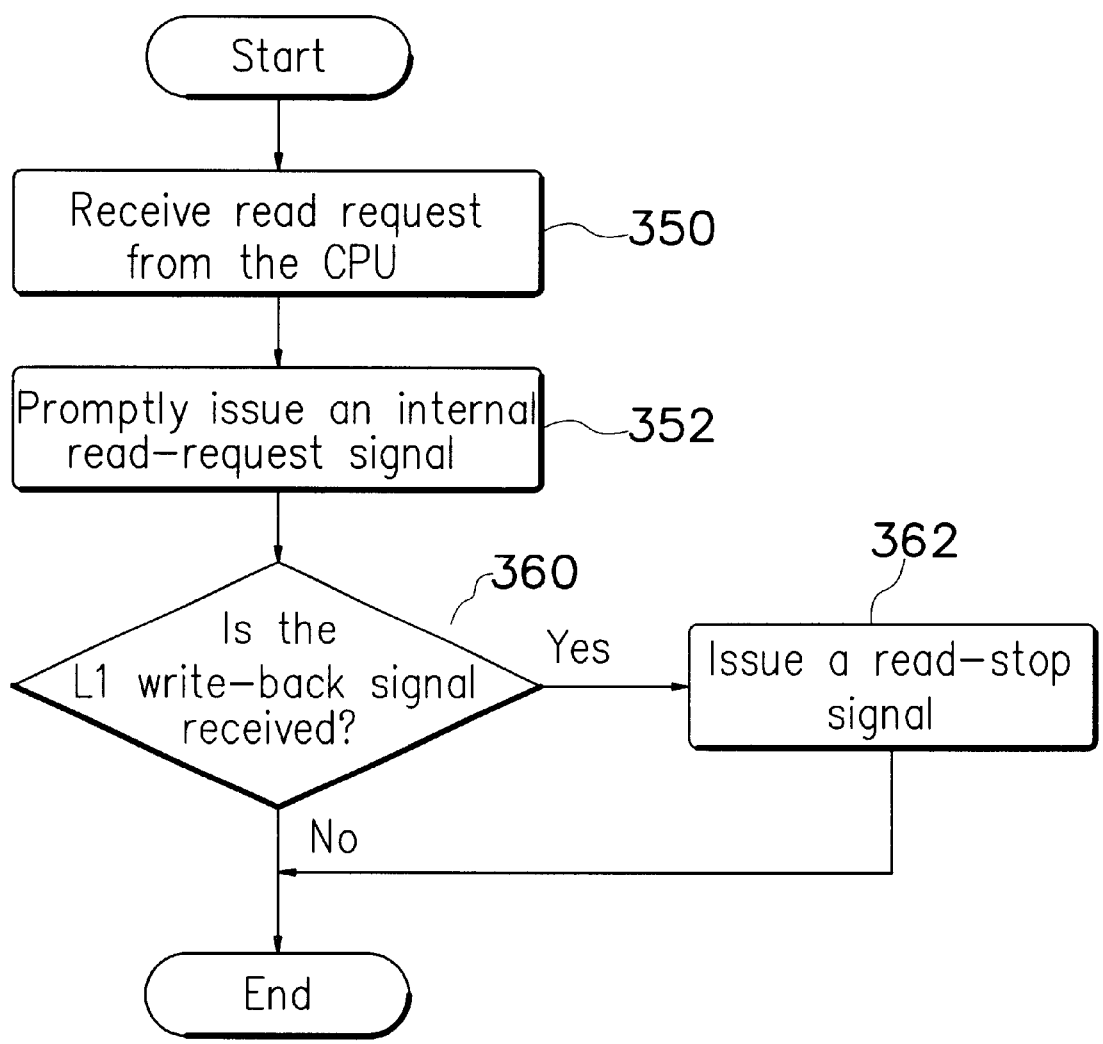
FIG. 3B is a flow diagram of the procedural steps carried out by the CPU interface utilized in the memory access control system of the invention shown in FIG. 1 when it is operating in the non-waiting mode.
Figure 4:
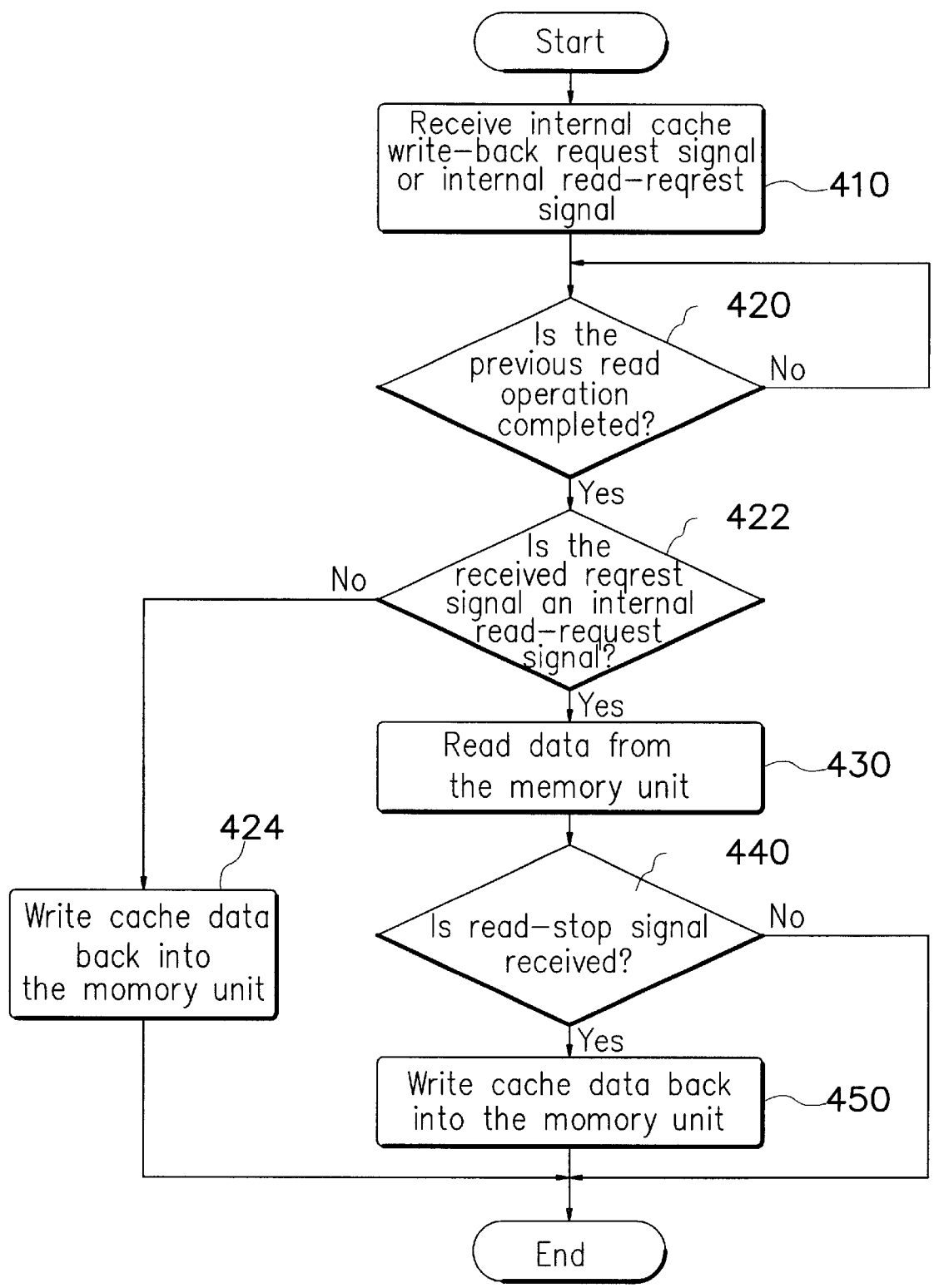
FIG. 4 is a flow diagram of the procedural steps carried out by the memory control unit utilized in the memory access control system of the invention shown in FIG. 1.

FIG. 2 is a flow diagram of the procedural steps carried out by the mode-switching unit 123 to switch the CPU interface 121 between the waiting (first) mode and the nonwaiting (second) mode; FIGS. 3A is a flow diagram of the procedural steps carried out by the CPU interface 121 when operating in the waiting mode; and FIG. 3B is a flow diagram of the procedural steps carried out by the CPU interface 121 when operating in the nonwaiting mode; and further, FIG. 4 is a flow diagram of the procedural steps carried out by the memory control unit 122 to perform memory access operation to the memory unit 130.

Referring to FIG. 2 together with FIG. 1, in the initial step 210, the mode-switching unit 123 is preset to switch the CPU interface 121 to the waiting mode, that is, the first mode, in which the CPU interface 121 operates in such a manner that, in response to each of the subsequently received read requests from the CPU 110, the CPU interface 121 will wait until the CPU 110 issues the L1 write-back signal of the read request and then issue the corresponding internal read-request signal to the memory control unit 122.

In the next step 220, the mode-switching unit 123 starts to count the number of consecutive cache-miss read requests and checks whether the count reaches a preset threshold, for example 200. If NO, the action of the step 220 will be continued; otherwise, if YES, the procedure will go to step 230. During this counting process for cache-miss read requests, however, if any cache-hit read request is received before the count reaches the preset threshold of 200, the count will be promptly reset to 0.

In the step 230, the mode-switching unit 123 switches the CPU interface 121 to the second operation mode, that is, the non-waiting mode, which causes the CPU interface 121 to hereafter operate in such a manner that, in response to each of the subsequently received read requests from the CPU 110, it will promptly issue the corresponding internal read-request signal to the memory unit 130 without waiting until the CPU 110 issues the L1 write-back signal of the read request. The procedure then goes to the step 240.

In the step 240, the mode-switching unit 123 continues to detect the signal state of the HITM data line to thereby judge whether an L1 write-back signal indicative of a cache hit is received. If NO, the mode-switching unit 123 continues the action of step 240, and the CPU interface 121 is maintained in the non-waiting mode; otherwise, if YES, the procedure jumps back to the step 210 to switch the CPU interface 121 to the waiting mode.

After the computer system is started, the mode-switching unit 123 continues to carry out the iterated loop of the procedure shown in FIG. 2 to thereby selectively switch the CPU interface 121 to either the waiting mode or the non-waiting mode that would make the memory access operation most efficient in performance.

FIGS. 3A is a flow diagram of the procedural steps carried out by the CPU interface 121 when operating in the waiting mode; and FIG. 3B is a flow diagram of the procedural steps carried out by the same when operating in the non-waiting mode.

Referring to FIG. 3A together with FIG. 1, in the first step 310, the CPU interface 121 receives a read request from the CPU 110. In most cases, a number of read requests rather than just a single read request will be received successively.

In the next step 312, the CPU interface 121 checks whether the CPU 110 issues an L1 write-back signal indicative of a cache hit for the currently received read request (normally, the L1 write-back signal of each read request will be issued in four clock cycles after the read request is issued). If NO, the procedure goes to the step 320; otherwise, if YES, the procedure goes to the step 322.

In the step 320, the CPU interface 121 issues the corresponding internal read-request signal for the currently received read request via the DADS data line to the memory control unit 122. The procedure is then ended.

On the other hand, in the step 322, the CPU interface 121 issues a cache write-back request signal via the DADS data line to the memory control unit 122, which will cause the memory control unit 122 to perform a cache write-back operation to write the cache data in the cache memory 112 from the CPU 110 back into the memory unit 130. The procedure is then ended.

Furthermore, FIG. 3B shows the procedural steps carried out by the CPU interface 121 when operating in the non-waiting mode.

AS shown, in the first step 350, the CPU interface 121 receives a read request via the ADS and REQ data lines from the CPU 110. In most cases, a number of read requests rather than just a single read request will be received successively. The procedure then goes to the step 352.

In the step 352, the CPU interface 121 promptly issue the corresponding internal read-request signal via the DADS data line to the memory unit 130 without waiting until the CPU 110 issues the L1 write-back signal of the currently received read request. The procedure then goes to the step 240. For each read request from the CPU 110, the CPU interface 121 will issues a corresponding internal read-request signal to the memory control unit 122. The procedure then goes to the step 360.

In the step 360, the CPU interface 121 checks whether an L1 write-back signal indicating that the current read request is a cache hit is received via the HITM data line from the CPU 110 (normally, the L1 write-back signal of each read request will be issued in four clock cycles after the read request is issued). If NO, the procedure is promptly ended; otherwise, if YES, the procedure goes to the step 362.

In the step 362, the CPU interface 121 promptly issues a read-stop signal via the MDOFF data line to the memory control unit 122, which will cause the memory control unit 122 to stop the read operation for the current read request and abandon the currently retrieved data from the memory unit 130 so as to instead perform a cache write-back operation to write the cache data in the cache memory 112 back into the memory unit 130. The procedure is then ended.

FIG. 4 is a flow diagram of the procedural steps carried out by the memory control unit 122 in response to each internal read-request signal and internal cache write-back request signal from the CPU interface 121.

Referring to FIG. 4 together with FIG. 1, in the first step 410, the memory control unit 122 receives an internal request signal, which may be either an internal read-request signal or an internal cache write-back request signal, via the DADS data line from the CPU interface 121.

In the next step 420, the memory control unit 122 checks whether the previous access operation, whether read or write, is completed. If NO, the memory control unit 122 continues the action of the step 420 until the result is YES. When the result is YES, i.e., the previous access operation is completed, the procedure then goes to the step 422.

In the step 422, the memory control unit 122 checks whether the received signal is an internal read-request signal. If NO (indicating that the received signal is an internal cache write-back request signal), the procedure goes to the step 424; otherwise, if YES, the procedure goes to the step 430.

In the step 424 (in which case, an internal cache write-back request signal is received), the memory control unit 122 performs a cache write-back operation to write the cache data in the cache memory 112 back into the memory unit 130. The procedure is then ended.

On the other hand, in the step 430 (in which case, an internal read-request signal is received), the memory control unit 122 starts to perform a read operation on the memory unit 130 to retrieve the requested data therefrom. In the case that the memory unit 130 is an SDRAM and that the requested data are located in a different page other than the one accessed by the previous access operation, the memory control unit 122 is required to issue successively a precharge-enable signal and an activate-enable signal via the CMD data line to the memory unit 130, which cause the memory unit 130 to open the page where the requested data are located so that the requested data can be retrieved. The procedure then goes to the step 440.

In the step 440, the memory control unit 122 checks whether a read-stop signal is received via the MDOFF data line from the CPU interface 121. If NO (which indicates that the current read request is a cache miss), the procedure is promptly ended; otherwise, if YES (which indicates that the current read request is a cache hit), the procedure goes to the step 450. In the step 450, the memory control unit 122 first abandons the currently retrieved data from the memory unit 130 and then performs a cache write-back operation to write the output cache data from the CPU 110 back into the memory unit 130. The procedure is then ended.

In the following, some performance comparison examples are used to better explain the advantages of the invention. In each of these performance comparison examples, the memory access operation in response to the same read requests is performed first in the waiting mode, and then in the non-waiting mode, to compare for the performance difference between these two operation modes and thereby demonstrate which of the two operation modes is better suited for use in certain conditions. The signal timing diagrams of these examples are respectively shown in FIGS. 5A–5B, FIGS. 6A–6B, FIGS. 7A–7B, FIGS. 8A–8B, FIGS. 9A–9B, FIGS. 10A–10B, and FIGS. 11A–11B (note that FIG. 5A, FIG. 6A, FIG. 7A, FIG. 8A, FIG. 9A, FIG. 10A, and FIG. 11A are the signal timing diagrams of the memory access operation in the waiting mode, while FIG. 5B, FIG. 6B, FIG. 7B, FIG. 8B, FIG. 9B, FIG. 10B, and FIG. 11B are the signal timing diagrams of the memory access operation in the non-waiting mode).

In all of these performance comparison examples, it is assumed that the burst length of each read request from the CPU 110 is four blocks of data, and the latency of the memory unit 130 is two clock cycles. Moreover, it is assumed that for each read request, the CPU 110 will issue the L1 write-back signal indicative of whether the read request is a hit or a miss to the cache memory 112 in four clock cycles after the read request is issued. The L1 write-back signal is issued via the HITM data line to the CPU interface 121. For instance, in the case that the CPU 110 issues three read requests successively at T1, T4, and T7, then for the first read request issued at T1, its L1 write-back signal will be issued at T5 via the HITM data line to the CPU interface 121; for second the read request issued at T4, its L1 write-back signal will be issued at T8 via the HITM data line to the CPU interface 121; and for the third read request issued at T7, its L1 write-back signal will be issued at T11 via the HITM data line to the CPU interface 121.

Figure 5A:
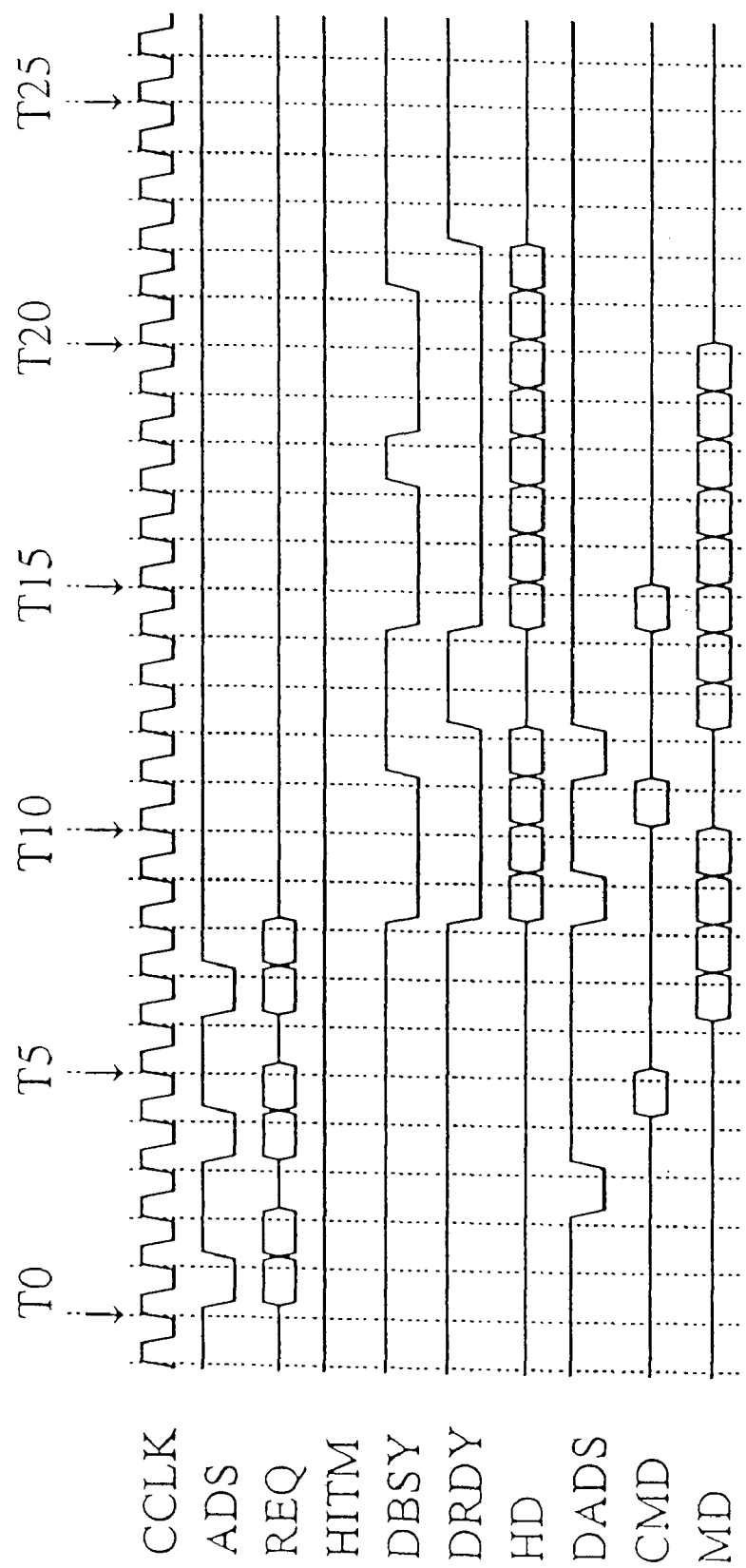
FIG. 5A–5B are two signal timing diagrams of the memory access control system of the invention, which are used to compare for the performance difference between the waiting mode and the non-waiting mode under a first assumed condition.
Figure 5B:
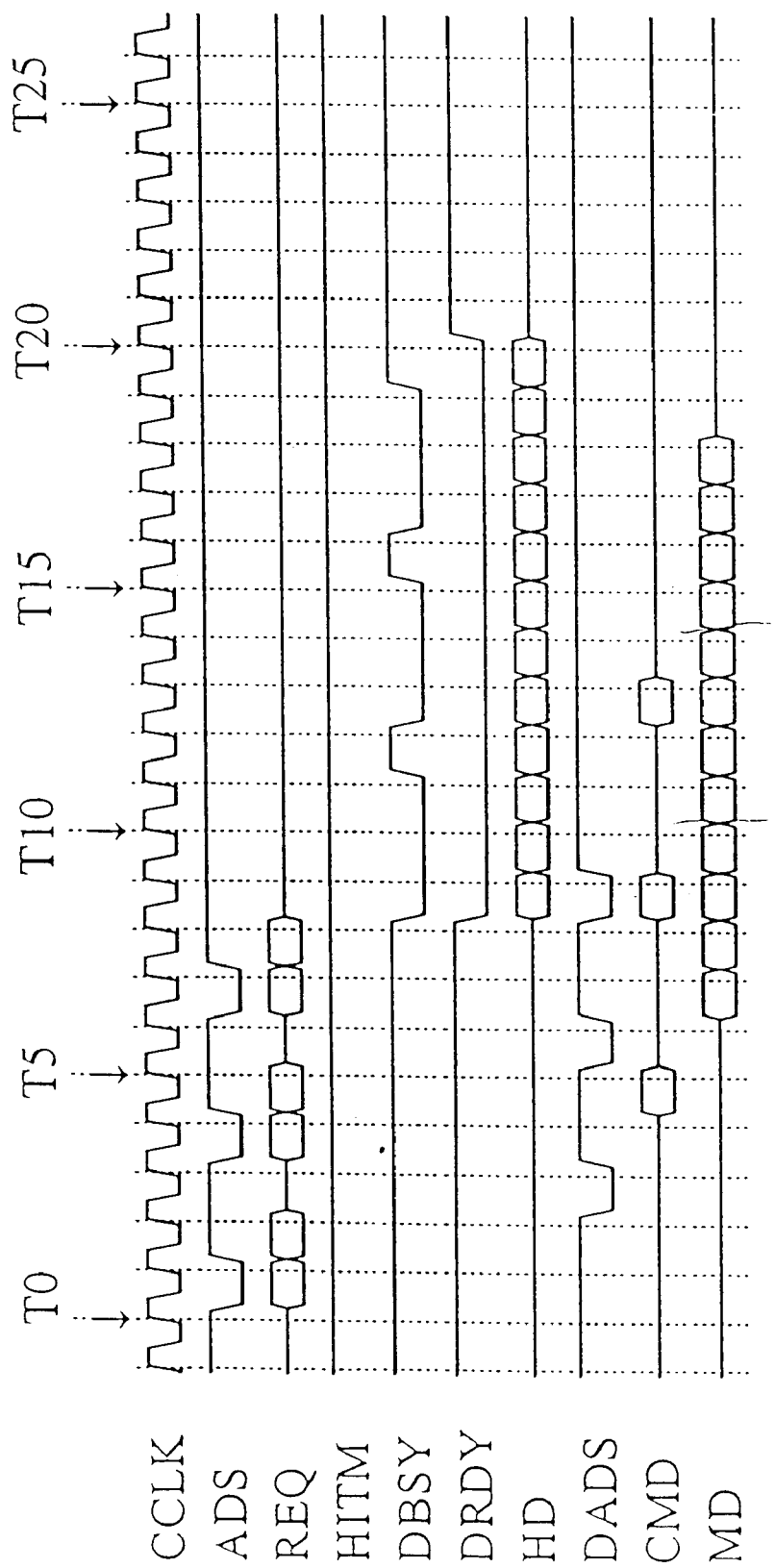

FIRST PERFORMANCE COMPARISON EXAMPLE (FIGS. 5A and 5B)

In the example of FIGS. 5A–5B, it is assumed that the CPU 110 issues successively three read requests to read data from the memory unit 130, with the data demanded by these three read requests being all located in the same opened page (on page) in the memory unit 130.

FIG. 5A shows the signal timing diagram of the memory access operation performed by the memory access control system 120 when the CPU interface 121 is operating in the waiting mode in response to the above-mentioned three read requests from the CPU 110 which are successively issued at T1, T4, and T7 via the ADS and REQ data lines. When the CPU interface 121 receives the first read request from the CPU 110, it assumes that the first read request is not a cache hit, and therefore promptly issues at T3 the corresponding internal read-request signal to the memory control unit 122 without waiting until the CPU 110 issues the L1 write-back signal of the first read request. Next, in response to each of the subsequent second and third read requests, the CPU interface 121 will instead wait four clock cycles until the CPU 110 issues the respective L1 write-back signals of the second and the third read requests, i.e., respectively until T9 and T12, and then issue the corresponding internal read-request signals to the memory control unit 122.

The memory control unit 122, in response to the first internal read-request signal from the CPU interface 121, first checks that the requested data are located in the currently opened page in the memory unit 130; and then, after two clock cycles, i.e., at T5, the memory control unit 122 starts to issue a read-enable signal to the memory unit 130. After a latency of two clock cycles, i.e., at T7, the memory unit 130 starts to output the four blocks of data demanded by the first read request via the MD data line to the memory control unit 122. These data are then transferred via the CPU interface 121 to the CPU 110.

With respect to the second read request, the memory control unit 122 receives at T9 the second internal read-request signal from the CPU interface 121. In response, the memory control unit 122 first checks that the requested data are located in the currently opened page; and then, after two clock cycles, i.e., at T11, the memory control unit 122 starts to issue a read-enable signal to the memory unit 130 for the second read request. In response, the memory unit 130 starts at T13 to output the four blocks of data demanded by the second read request.

Furthermore, with respect to the third read request, the memory control unit 122 receives at T12 the third internal read-request signal from the CPU interface 121. At this time, however, since the memory unit 130 is still busy taking care of the previous read request, the memory control unit 122 will wait until the memory unit 130 completes the outputting of the third block of data demanded by the previous read request, i.e., until T15, and then issue a read-enable signal to the memory unit 130 for the third read request. After a latency of two clock cycles, i.e., at T17, the memory unit 130 starts to output the four blocks of data demanded by the third read request.

For comparison purpose, the foregoing memory access operation in response to the same three read requests from the CPU 110 is hereunder instead performed by the memory access control system 120 with the CPU interface 121 being switched to the non-waiting mode to compare for the performance difference between the two operation modes.

FIG. 5B shows the signal timing diagram of the memory access operation performed by the memory access control system 120 when the CPU interface 121 is operating in the non-waiting mode in response to the same three read requests from the CPU 110 which are successively issued at T1, T4, and T7 via the ADS and REQ data lines. When the CPU interface 121 receives the first read request from the CPU 110, the CPU interface 121 promptly issues at T3 the corresponding internal read-request signal to the memory control unit 122. In a different manner from the case of FIG. 5A, however, when the CPU interface 121 receives the second read request from the CPU 110, it promptly issues at T6 the corresponding internal read-request signal via the DADS data line to the memory unit 130 without waiting until the CPU 110 issues the L1 write-back signal of the second read request; and next, when the CPU interface 121 receives the third read request from the CPU 110, it also promptly issues at T9 the corresponding internal read-request signal via the DADS data line to the memory control unit 122 without waiting until the CPU 110 issues the L1 write-back signal of the third read request.

The memory control unit 122, in response to the first internal read-request signal from the CPU interface 121, first checks that the requested data are located in the currently opened page in the memory unit 130; and then, at T5, the memory control unit 122 starts to issue a read-enable signal via the CMD data line to the memory unit 130. After a latency of two clock cycles, i.e., at T7, the memory unit 130 starts to output the requested four blocks of data via the MD data line to the memory control unit 122. These data are then transferred via the CPU interface 121 to the CPU 110.

With respect to the second read request, the memory control unit 122 receives at T6 the second internal read-request signal from the CPU interface 121. At this time, however, since the previous read operation for the first read request is not yet completed, the memory control unit 122 will wait until the memory unit 130 completes the outputting of the third block data for the first read request, i.e., until T9, and then start to issue a read-enable signal to the memory unit 130 for the second read request. After a latency of two clock cycles after the read-enable signal is received, i.e., at T11, the memory unit 130 has just readily competed the outputting of the last block of data for the previous read request, and therefore promptly starts to output the four blocks of data demanded by the second read request via the MD data line to the CPU interface 121. These data are then transferred via the CPU interface 121 to the CPU 110.

Furthermore, with respect to the third read request, the memory control unit 122 receives at T9 the third internal read-request signal from the CPU interface 121. In a similar manner as the previous read request, the memory control unit 122 will wait until the memory unit 130 completes the outputting of the third block data for the previous read request, i.e., until T13, and then start to issue a read-enable signal to the memory unit 130 for the third read request. After a latency of two clock cycles after the read-enable signal is received, i.e., at T15, the memory unit 130 has just readily competed the outputting of the last block of data for the previous read request, and therefore promptly starts to output the four blocks of data demanded by the second read request via the MD data line to the memory control unit 122. These data are then transferred via the CPU interface 121 to the CPU 110.

By comparing FIG. 5B with FIG. 5A, it can be seen that, when the CPU interface 121 is operating in the waiting mode, it requires a total of 22 clock cycles to respond to the three successively issued read requests from the CPU 110. By contrast, in the non-waiting mode, it requires only 20 clock cycles to complete. It is apparent that in this case the non-waiting mode is more efficient in memory access performance than the waiting mode.

Figure 6A:
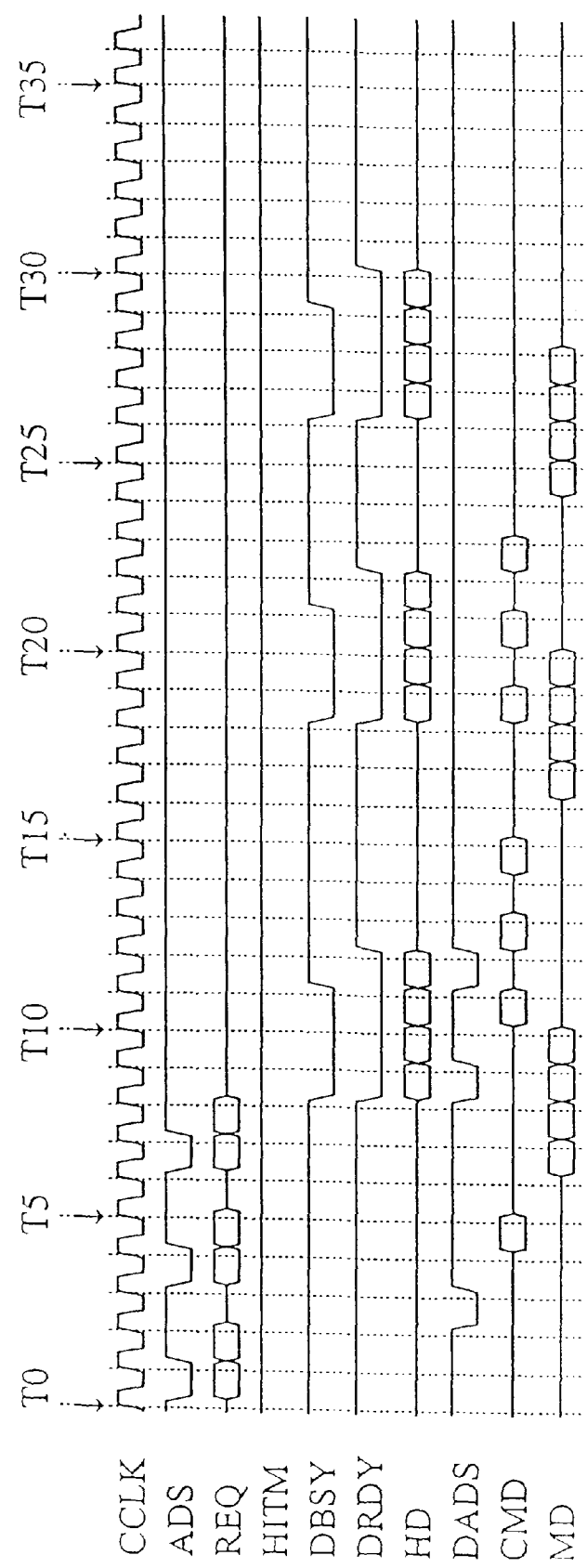
FIG. 6A–6B are two signal timing diagrams of the memory access control system of the invention, which are used to compare for the performance difference between the waiting mode and the non-waiting mode under a second assumed condition.
Figure 6B:
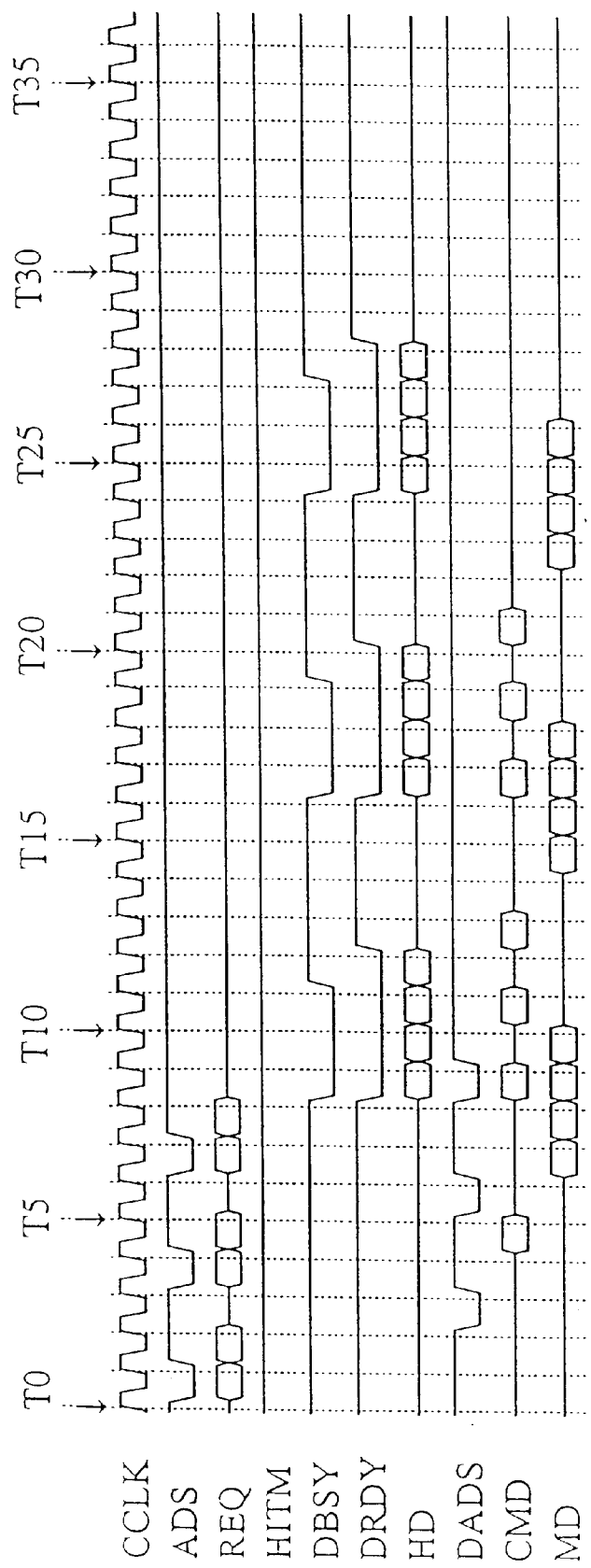

SECOND PERFORMANCE COMPARISON EXAMPLE (FIGS. 6A and 6B)

In the example of FIGS. 6A–6B, it is assumed that the CPU 110 issues successively three read requests to the memory unit 130, with the data demanded by the first read request being located in the currently opened page, and the data demanded by the second and third read requests being located respectively in two different closed pages (off pages).

FIG. 6A shows the signal timing diagram of the memory access operation performed by the memory access control system 120 when the CPU interface 121 is operating in the waiting mode in response to the above-mentioned three sorts of read requests from the CPU 110 which are successively issued at T1, T4, and T7 via the ADS and REQ data lines. When the CPU interface 121 receives the first read request from the CPU 110, it assumes, for example, that the first read request is not a cache write-back request, and therefore promptly issues at T3 the corresponding internal read-request signal to the memory control unit 122 without waiting until the CPU 110 issues the L1 write-back signal of the first read request. Next, in response to each of the subsequent second and third read requests, the CPU interface 121 will instead wait four clock cycles until the CPU 110 issues the respective L1 write-back signals of the second and the third read requests, i.e., respectively until T9 and T12, and then issue the corresponding internal read-request signals to the memory control unit 122.

The memory control unit 122, in response to the first internal read-request signal from the CPU interface 121, first checks that the requested data are located in the currently opened page in the memory unit 130; and then, after two clock cycles, i.e., at T5, the memory control unit 122 starts to issue a read-enable signal to the memory unit 130. After a latency of two clock cycles, i.e., at T7, the memory unit 130 starts to output the requested four blocks of data via the MD data line to the memory control unit 122. These data are then transferred via the CPU interface 121 to the CPU 110.

With respect to the second read request, the memory control unit 122 receives at T9 the second internal read-request signal from the CPU interface 121. In response, the memory control unit 122 first checks that the requested data are located in a closed page in the memory unit 130; and then at T11, the memory control unit 122 starts to issue successively a precharge-enable signal, an activate-enable signal, and a read-enable signal to the memory unit 130 for the second read request. In response to these signals, the memory unit 130 first opens the page where the requested data are located, and then starts at T17 to output the requested data.

Furthermore, with respect to the third read request, the memory control unit 122 receives at T12 the third internal read-request signal from the CPU interface 121. At this time, however, since the memory unit 130 is still busy taking care of the previous read request, the memory control unit 122 will wait until the memory unit 130 completes the outputting of the third block of data demanded by the previous read request, i.e., until T19, and then start to issue successively a precharge-enable signal, an activate-enable signal, and a read-enable signal to the memory unit 130 for the third read request. In response to these signals, the memory unit 130 first opens the page where the requested data are located, and then starts at T25 to output the four blocks of data demanded by the third read request.

For comparison purpose, the foregoing memory access operation in response to the same three read requests from the CPU 110 is hereunder instead performed by the memory access control system 120 with the CPU interface 121 being switched to the non-waiting mode to compare for the performance difference between the two operation modes.

FIG. 6B shows the signal timing diagram of the memory access operation performed by the memory access control system 120 when the CPU interface 121 is operating in the non-waiting mode in response to the same three read requests from the CPU 110 which are successively issued at T1, T4, and T7 via the ADS and REQ data lines. When the CPU interface 121 receives the first read request from the CPU 110, it promptly issues at T3 the corresponding internal read-request signal via the DADS data line to the memory control unit 122. Subsequently, when the CPU interface 121 receives the second and third read requests from the CPU 110, it promptly issues respectively at T6 and T9 the corresponding internal read-request signals via the DADS data line to the memory control unit 122 without waiting until the CPU 110 issues the respective L1 write-back signals of the second and third read requests.

The memory control unit 122, in response to the first internal read-request signal from the CPU interface 121, first checks that the requested data are located in the currently opened page in the memory unit 130; and then, after two clock cycles, i.e., at T5, the memory control unit 122 starts to issue a read-enable signal via the CMD data line to the memory unit 130 for the first read request. After a latency of two clock cycles, i.e., at T7, the memory unit 130 starts to output the requested four blocks of data via the MD data line to the memory control unit 122. These data are then transferred via the CPU interface 121 to the CPU 110.

With respect to the second read request, the memory control unit 122 receives at T6 the second internal read-request signal from the CPU interface 121 and then checks that the requested data are located in a closed page. At this time, however, since the previous read operation for the first read request is not yet completed, the memory control unit 122 will wait until T9 and then start to issue successively a precharge-enable signal, an activate-enable signal, and a read-enable signal via the CMD data line to the memory unit 130 for the second read request. In response to these signals, the memory unit 130 first opens the page where the requested data are located, and then starts at T15 to output the requested data. These data are then transferred via the CPU interface 121 to the CPU 110.

Furthermore, with respect to the third read request, the memory control unit 122 receives at T9 the third internal read-request signal from the CPU interface 121. At this time, however, since the memory unit 130 is still busy taking care of the previous read request, the memory control unit 122 will wait until the memory unit 130 completes the outputting of the third block of data for the previous read request, i.e., until T17, and then start to issue successively a precharge-enable signal, an activate-enable signal, and a read-enable signal to the memory unit 130 for the third read request. In response to these signals, the memory unit 130 first opens the page where the requested data are located, and then starts at T23 to output the four blocks of data demanded by the third read request. These data are then transferred via the CPU interface 121 to the CPU 110.

By comparing FIG. 6B with FIG. 6A, it can be seen that, when the CPU interface 121 is operating in the waiting mode, it requires a total of 30 clock cycles to respond to the three successively issued read requests from the CPU 110. By contrast, in the non-waiting mode, it requires only 28 clock cycles to complete. It is apparent that in this case the non-waiting mode is more efficient in memory access performance than the waiting mode.

Figure 7A:
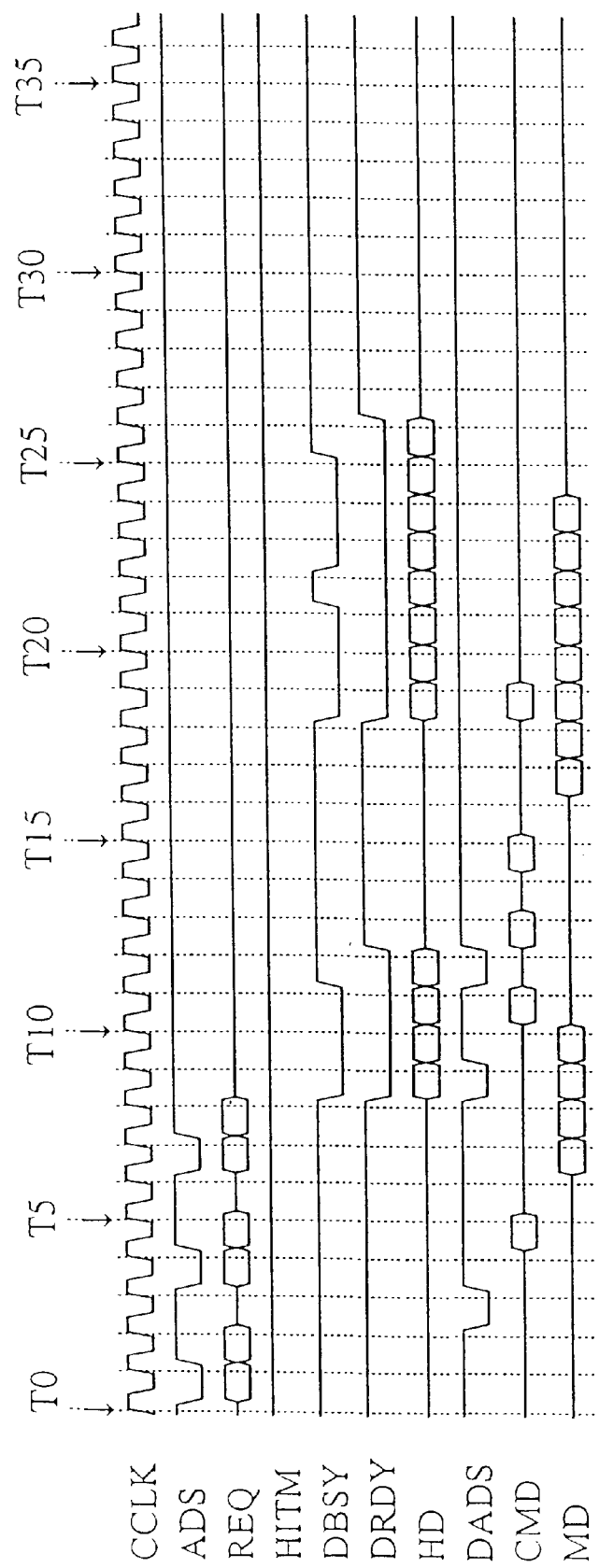
FIG. 7A–7B are two signal timing diagrams of the memory access control system of the invention, which are used to compare for the performance difference between the waiting mode and the non-waiting mode under a third assumed condition.
Figure 7B:
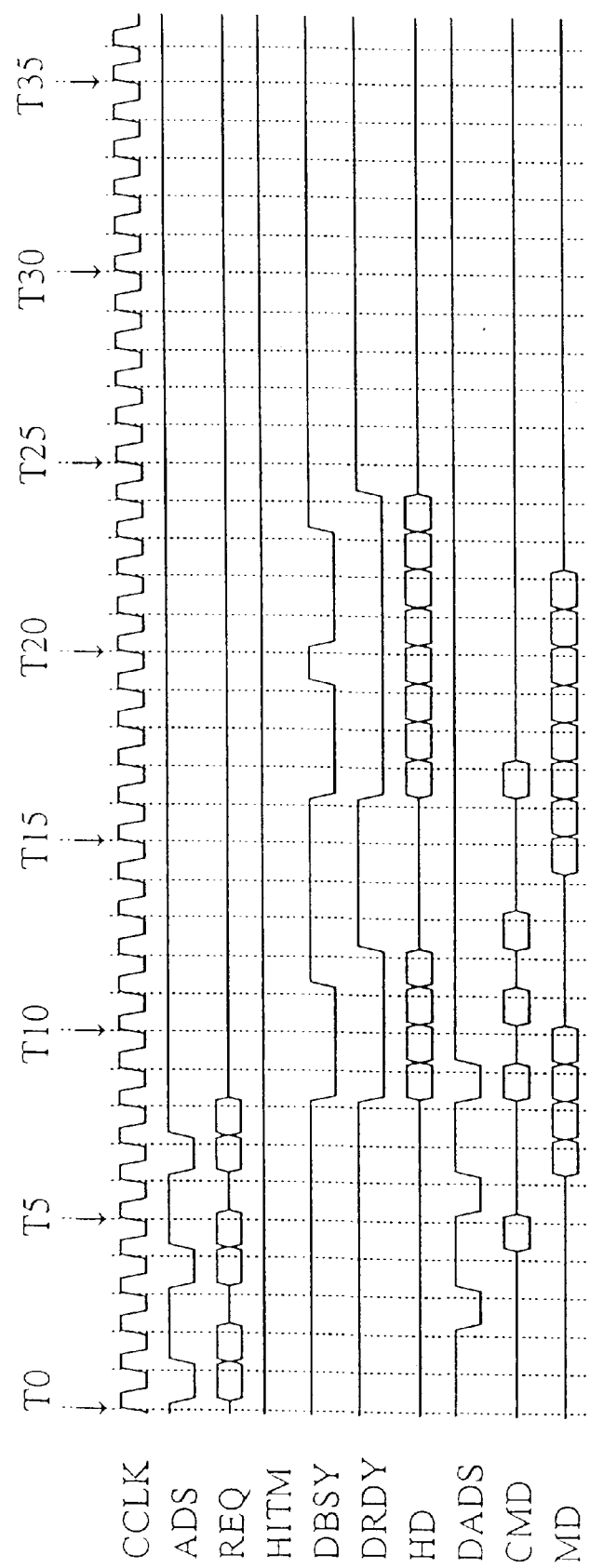

THIRD PERFORMANCE COMPARISON EXAMPLE (FIGS. 7A and 7B)

In the example of FIGS. 7A–7B, it is assumed that the CPU 110 issues successively three read requests to the memory unit 130, with the data demanded by the first read request being located in the currently opened page, the data demanded by the second read request being located in a closed page, and the data demanded by the third read request being located in the same closed page as the second read request.

FIG. 7A shows the signal timing diagram of the memory access operation performed by the memory access control system 120 when the CPU interface 121 is operating in the waiting mode in response to the above-mentioned three sorts of read requests from the CPU 110 which are successively issued at T1, T4, and T7 via the ADS and REQ data lines. When the CPU interface 121 receives the first read request from the CPU 110, it assumes that the first read request is not a cache hit, and therefore promptly issues at T3 the corresponding internal read-request signal to the memory control unit 122 without waiting until the CPU 110 issues the L1 write-back signal of the first read request. Next, in response to each of the subsequent second and third read requests, the CPU interface 121 will instead wait four clock cycles until the CPU 110 issues the respective L1 write-back signals of the second and the third read requests, i.e., respectively until T9 and T12, and then issue the corresponding internal read-request signals to the memory control unit 122.

The memory control unit 122, in response to the first internal read-request signal from the CPU interface 121, first checks that the requested data are located in the currently opened page in the memory unit 130; and then, after two clock cycles, i.e., at T5, the memory control unit 122 starts to issue a read-enable signal to the memory unit 130. After a latency of two clock cycles, i.e., at T7, the memory unit 130 starts to output the requested four blocks of data via the MD data line to the memory control unit 122. These data are then transferred via the CPU interface 121 to the CPU 110.

With respect to the second read request, the memory control unit 122 receives at T9 the second internal read-request signal from the CPU interface 121. In response, the memory control unit 122 first checks that the requested data are located in a closed page in the memory unit 130; and then at T11, the memory control unit 122 starts to issue successively a precharge-enable signal, an activate-enable signal, and a read-enable signal via the CMD data line to the memory unit 130. In response to these signals, the memory unit 130 first opens the page where the requested data are located, and then starts at T17 to output the requested data. These data are then transferred via the CPU interface 121 to the CPU 110.

Furthermore, with respect to the third read request, the memory control unit 122 receives at T12 the third internal read-request signal from the CPU interface 121. At this time, however, since the memory unit 130 is still busy taking care of the previous read request, the memory control unit 122 will wait until the memory unit 130 completes the outputting of the third block of data demanded by the previous read request, i.e., until T19, and then start to issue a read-enable signal to the memory unit 130 for the third read request (only read-enable signal, and no precharge-enable signal and no activate-enable signal, is issued because the requested data are located in the same page demanded by the previous read request). After a latency of two clock cycles, i.e., at T21, the memory unit 130 then starts to output the four blocks of data demanded by the third read request via the MD data line to the memory control unit 122. These data are then transferred via the CPU interface 121 to the CPU 110.

For comparison purpose, the foregoing memory access operation in response to the same three read requests from the CPU 110 is hereunder instead performed by the memory access control system 120 with the CPU interface 121 being switched to the non-waiting mode to compare for the performance difference between the two operation modes.

FIG. 7B shows the signal timing diagram of the memory access operation performed by the memory access control system 120 when the CPU interface 121 is operating in the non-waiting mode in response to the same three read requests from the CPU 110 which are successively issued at T1, T4, and T7 via the ADS and REQ data lines. When the CPU interface 121 receives the first read request from the CPU 110, it promptly issues at T3 the corresponding internal read-request signal via the DADS data line to the memory control unit 122. Subsequently, when the CPU interface 121 receives the second read request from the CPU 110, it promptly issues at T6 the corresponding internal read-request signal via the DADS data line to the memory control unit 122 without waiting until the CPU 110 issues the L1 write-back signal of the second read request; and next, when the CPU interface 121 receives the third read request from the CPU 110, it also promptly issues at T9 the corresponding internal read-request signal via the DADS data line to the memory control unit 122 without waiting until the CPU 110 issues the L1 write-back signal of the third read request.

The memory control unit 122, in response to the first internal read-request signal from the CPU interface 121, first checks that the requested data are located in the currently opened page in the memory unit 130; and then, after two clock cycles, i.e., at T5, the memory control unit 122 starts to issue a read-enable signal to the memory unit 130 for the first read request. After a latency of two clock cycles, i.e., at T7, the memory unit 130 starts to output the requested four blocks of data via the MD data line to the memory control unit 122. These data are then transferred via the CPU interface 121 to the CPU 110.

With respect to the second read request, the memory control unit 122 receives at T6 the second internal read-request signal from the CPU interface 121 and checks that the requested data are located in a closed page. At this time, however, since the previous read operation for the first read request is not yet completed, the memory control unit 122 will wait until T9 and then start to issue successively a precharge-enable signal, an activate-enable signal, and a read-enable signal via the CMD data line to the memory unit 130 for the second read request. In response to these signals, the memory unit 130 first opens the page where the requested data are located, and then starts at T15 to output the requested data. These data are then transferred via the CPU interface 121 to the CPU 110.

Furthermore, with respect to the third read request, the memory control unit 122 receives at T9 the third internal read-request signal from the CPU interface 121. At this time, however, since the memory unit 130 is still busy taking care of the previous read request, the memory control unit 122 will wait until the memory unit 130 completes the outputting of the third block of data for the previous read request, i.e., until T17, and then start to issue a read-enable signal to the memory unit 130 (only read-enable signal, and no precharge-enable signal and no activate-enable signal, is issued because the requested data are located in the same page demanded by the previous read request). In response, the memory unit 130 starts after a latency of two clock cycles, i.e., at T19, to output the four blocks of data demanded by the third read request via the MD data line to the memory control unit 122. These data are then transferred via the CPU interface 121 to the CPU 110.

By comparing FIG. 7B with FIG. 7A, it can be seen that, when the CPU interface 121 is operating in the waiting mode, it requires a total of 26 clock cycles to respond to the three successively issued read requests from the CPU 110. By contrast, in the non-waiting mode, it requires only 24 clock cycles to complete. It is apparent that in this case the non-waiting mode is more efficient in memory access performance than the waiting mode.

Figure 8A:
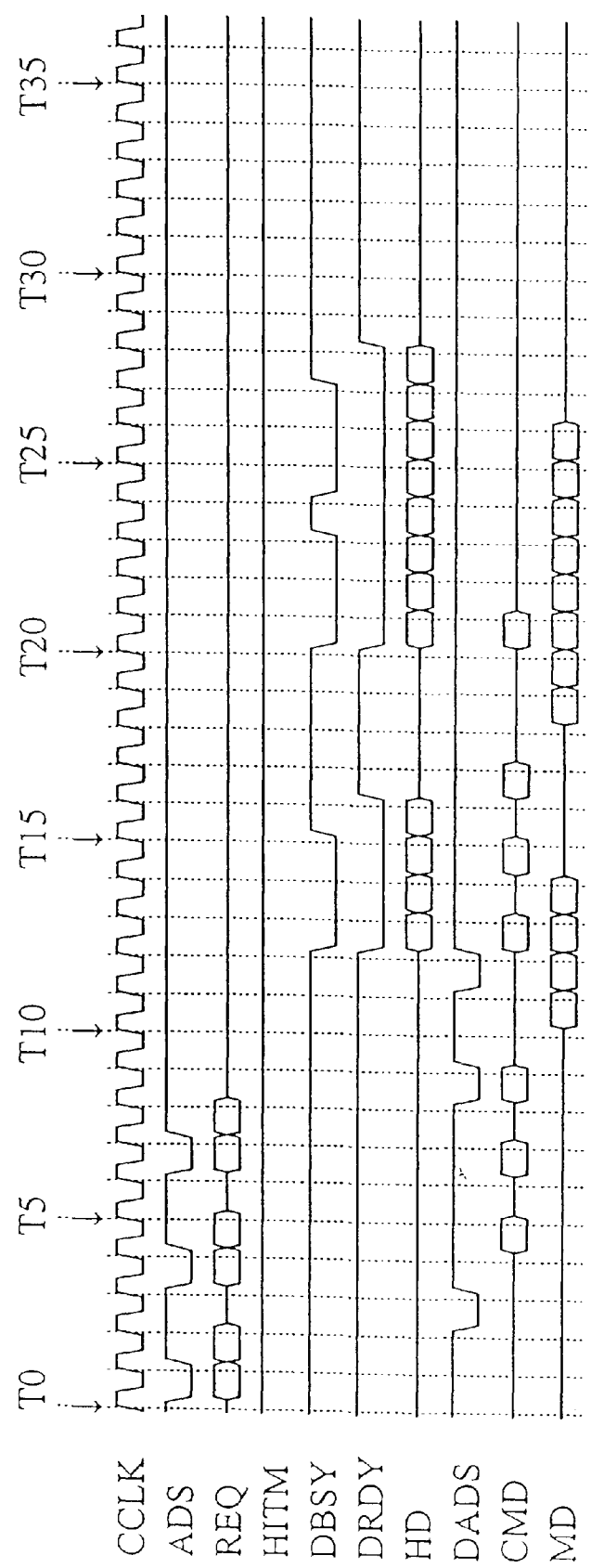
FIG. 8A–8B are two signal timing diagrams of the memory access control system of the invention, which are used to compare for the performance difference between the waiting mode and the non-waiting mode under a fourth assumed condition.
Figure 8B:
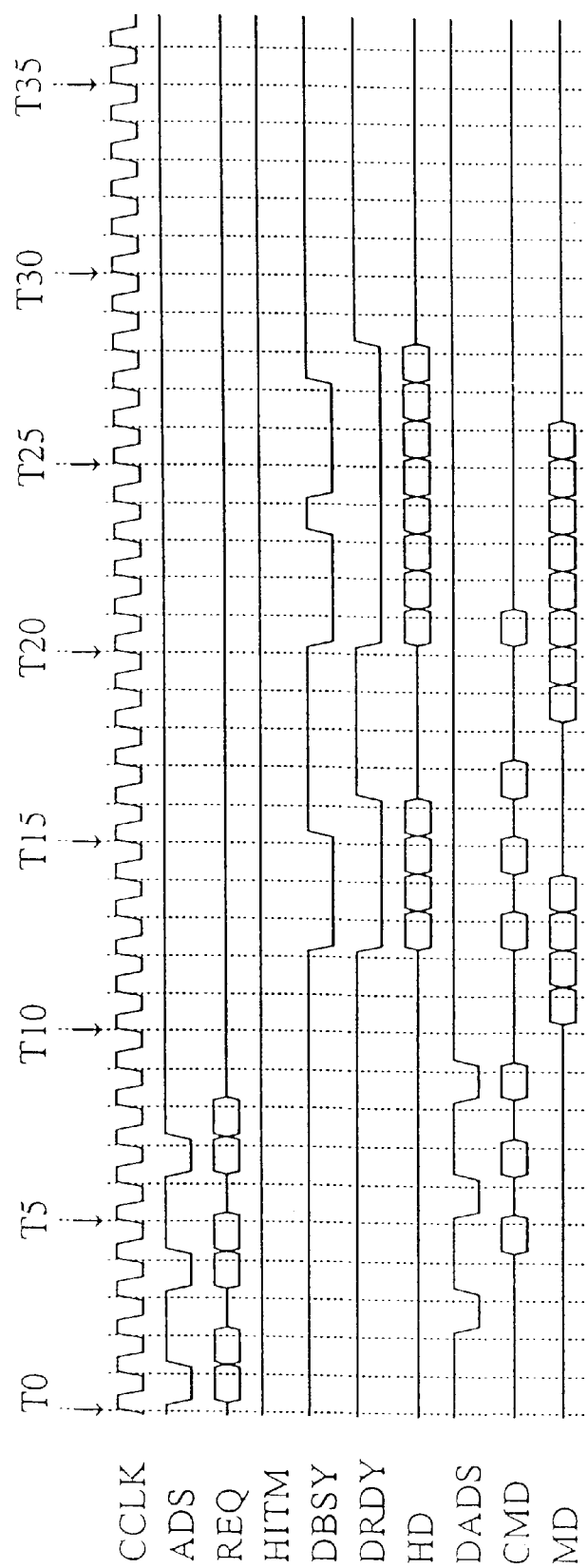

FOURTH PERFORMANCE COMPARISON EXAMPLE (FIGS. 8A and 8B)

In the example of FIGS. 8A–8B, it is assumed that the CPU 110 issues successively three read requests to the memory unit 130, with the data demanded by the first and second read request being located respectively in two different closed pages, and the data demanded by the third read request being located in the same page as the second read request.

FIG. 8A shows the signal timing diagram of the memory access operation performed by the memory access control system 120 when the CPU interface 121 is operating in the waiting mode in response to the above-mentioned three sorts of read requests successively issued at T1, T4, and T7 from the CPU 110 via the ADS and REQ data lines. When the CPU interface 121 receives the first read request from the CPU 110, it assumes that the first read request is not a cache hit, and therefore promptly issues at T3 the corresponding internal read-request signal to the memory control unit 122 without waiting until the CPU 110 issues the L1 write-back signal of the first read request. Next, in response to each of the subsequent second and third read requests, the CPU interface 121 will instead wait four clock cycles until the CPU 110 issues the respective L1 write-back signals of the second and the third read requests, i.e., respectively until T9 and T12, and then issue the corresponding internal read-request signals to the memory control unit 122.

The memory control unit 122, in response to the first internal read-request signal from the CPU interface 121, first checks that the requested data are located in a closed page in the memory unit 130; and then, after two clock cycles, i.e., at T5, the memory control unit 122 starts to issue successively a precharge-enable signal, an activate-enable signal, and a read-enable signal to the memory unit 130 for the first read request. In response to these signals, the memory unit 130 first opens the page where the requested data are located; and after a latency of two clock cycles after the read-enable signal is received, i.e., at T11, the memory unit 130 starts to output the requested four blocks of data via the MD data line to the memory control unit 122. These data are then transferred via the CPU interface 121 to the CPU 110.

With respect to the second read request, the memory control unit 122 receives at T9 the second internal read-request signal from the CPU interface 121. In response, the memory control unit 122 first checks that the requested data are located in another closed page in the memory unit 130. At this time, however, since the memory unit 130 is still busy taking care of the previous read request, the memory control unit 122 will wait until T13 and then start to issue successively a precharge-enable signal, an activate-enable signal, and a read-enable signal to the memory unit 130 for the second read request. In response to these signals, the memory unit 130 first opens the page where the requested data are located, and then starts at T19 to output the requested data. These data are then transferred via the CPU interface 121 to the CPU 110.

Furthermore, with respect to the third read request, the memory control unit 122 receives at T12 the third internal read-request signal from the CPU interface 121. At this time, however, since the memory unit 130 is still busy taking care of the previous read request, the memory control unit 122 will wait until the memory unit 130 completes the outputting of the third block of data demanded by the previous read request, i.e., until T21, and then start to issue a read-enable signal to the memory unit 130 for the third read request (only read-enable signal, and no precharge-enable signal and no activate-enable signal, is issued because the requested data are located in the same page demanded by the previous read request). After a latency of two clock cycles, i.e., at T23, the memory unit 130 then starts to output the four blocks of data demanded by the third read request via the MD data line to the memory control unit 122. These data are then transferred via the CPU interface 121 to the CPU 110.

For comparison purpose, the foregoing memory access operation in response to the same three read requests from the CPU 110 is hereunder instead performed by the memory access control system 120 with the CPU interface 121 being switched to the non-waiting mode to compare for the performance difference between the two operation modes.

FIG. 8B shows the signal timing diagram of the memory access operation performed by the memory access control system 120 when the CPU interface 121 is operating in the non-waiting mode in response to the same three read requests from the CPU 110 which are successively issued at T1, T4, and T7 via the ADS and REQ data lines. When the CPU interface 121 receives the first read request from the CPU 110, it promptly issues at T3 the corresponding internal read-request signal via the DADS data line to the memory control unit 122. Subsequently, when the CPU interface 121 receives the second read request from the CPU 110, it promptly issues at T6 the corresponding internal read-request signal via the DADS data line to the memory control unit 122 without waiting until the CPU 110 issues the L1 write-back signal of the second read request; and next, when the CPU interface 121 receives the third read request from the CPU 110, it promptly issues at T9 the corresponding internal read-request signal via the DADS data line to the memory control unit 122 without waiting until the CPU 110 issues the L1 write-back signal of the third read request.

The memory control unit 122, in response to the first internal read-request signal from the CPU interface 121, first checks that the requested data are located in a closed page in the memory unit 130; and then, after two clock cycles, i.e., at T5, the memory control unit 122 starts to issue successively a precharge-enable signal, an activate-enable signal, and a read-enable signal to the memory unit 130 for the first read request. In response to these signals, the memory unit 130 first opens the page where the requested data are located; and then after a latency of two clock cycles after the read-enable signal is received, i.e., at T11, the memory unit 130 starts to output the four blocks of data demanded by the first read request via the MD data line to the memory control unit 122. These data are then transferred via the CPU interface 121 to the CPU 110.

With respect to the second read request, the memory control unit 122 receives at T6 the second internal read-request signal from the CPU interface 121 and checks that the requested data are located in another closed page. At this time, however, since the previous read operation for the first read request is not yet completed, the memory control unit 122 will wait until T13 and then start to issue successively a precharge-enable signal, an activate-enable signal, and a read-enable signal via the CMD data line to the memory unit 130 for the second read request. In response to these signals, the memory unit 130 first opens the page where the requested data are located, and then starts at T19 to output the requested data. These data are then transferred via the CPU interface 121 to the CPU 110.

Furthermore, with respect to the third read request, the memory control unit 122 receives at T9 the third internal read-request signal from the CPU interface 121. At this time, however, since the memory unit 130 is still busy taking care of the previous read request, the memory control unit 122 will wait until the memory unit 130 completes the outputting of the third block of data for the previous read request, i.e., until T21, and then start to issue a read-enable signal to the memory unit 130 for the third read request (only read-enable signal, and no precharge-enable signal and no activate-enable signal, is issued because the requested data are located in the same page demanded by the previous read request). After a latency of two clock cycles after the read-enable signal is received, i.e., at T23, the memory unit 130 starts to output the four blocks of data demanded by the third read request via the MD data line to the memory control unit 122. These data are then transferred via the CPU interface 121 to the CPU 110.

By comparing FIG. 8B with FIG. 8A, it can be seen that, when the CPU interface 121 is operating in the waiting mode, it requires a total of 28 clock cycles to respond to the three successively issued read requests from the CPU 110. Similarly, in the non-waiting mode, it also requires the same 28 clock cycles to complete. It is apparent that in this case the non-waiting mode is equal in memory access performance to the waiting mode.

Figure 9A:
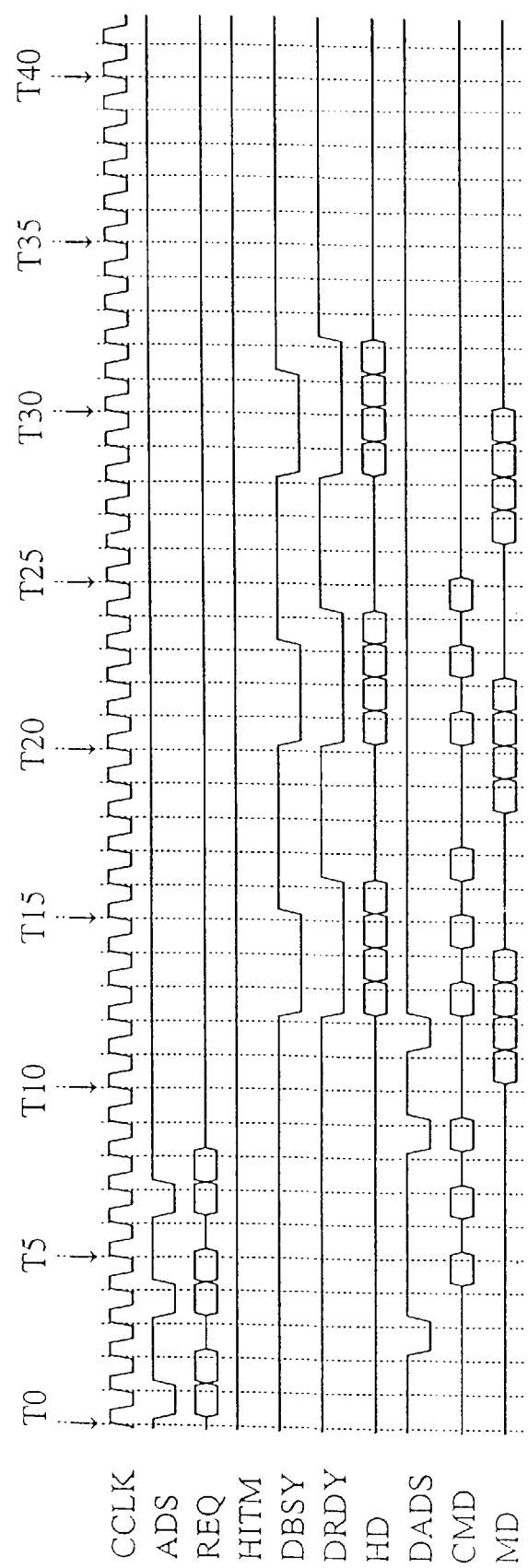
FIG. 9A–9B are two signal timing diagrams of the memory access control system of the invention, which are used to compare for the performance difference between the waiting mode and the non-waiting mode under a fifth assumed condition.
Figure 9B:
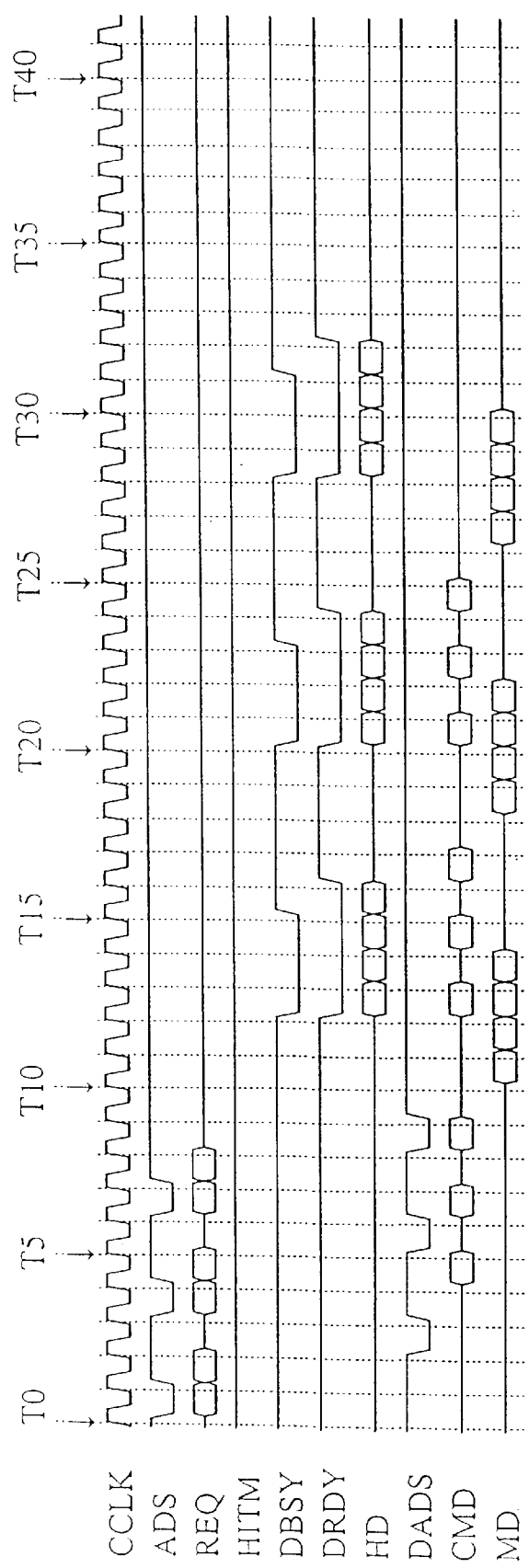

FIFTH PERFORMANCE COMPARISON EXAMPLE (FIGS. 9A and 9B)

In the example of FIGS. 9A–9B, it is assumed that the CPU 110 issues successively three read requests to the memory unit 130, with the data demanded by these three read requests being located respectively in three different closed pages.

FIG. 9A shows the signal timing diagram of the memory access operation performed by the memory access control system 120 when the CPU interface 121 is operating in the waiting mode in response to the above-mentioned three sorts of read requests successively issued at T1, T4, and T7 from the CPU 110 via the ADS and REQ data lines. When the CPU interface 121 receives the first read request from the CPU 110, it assumes that the first read request is not a cache hit, and therefore promptly issues at T3 the corresponding internal read-request signal to the memory control unit 122 without waiting until the CPU 110 issues the L1 write-back signal of the first read request. Next, in response to each of the subsequent second and third read requests, the CPU interface 121 will instead wait four clock cycles until the CPU 110 issues the respective L1 write-back signals of the second and the third read requests, i.e., respectively until T9 and T12, and then issue the corresponding internal read-request signals to the memory control unit 122.

The memory control unit 122, in response to the first internal read-request signal from the CPU interface 121, first checks that the requested data are located in a closed page in the memory unit 130; and then, after two clock cycles, i.e., at T5, the memory control unit 122 starts to issue successively a precharge-enable signal, an activate-enable signal, and a read-enable signal to the memory unit 130 for the first read request. In response to these signals, the memory unit 130 first opens the page where the requested data are located; and then, after a latency of two clock cycles after the read-enable signal is received, i.e., at T11, the memory unit 130 starts to output the requested four blocks of data via the MD data line to the memory control unit 122. These data are then transferred via the CPU interface 121 to the CPU 110.

With respect to the second read request, the memory control unit 122 receives at T9 the second internal read-request signal from the CPU interface 121. In response, the memory control unit 122 first checks that the requested data are located in another closed page in the memory unit 130. At this time, however, since the memory unit 130 is still busy taking care of the previous read request, the memory control unit 122 will wait until T13 and then start to issue successively a precharge-enable signal, an activate-enable signal, and a read-enable signal via the CMD data line to the memory unit 130 for the second read request. In response to these signals, the memory unit 130 first opens the page where the requested data are located, and then starts at T19 to output the requested data. These data are then transferred via the CPU interface 121 to the CPU 110.

Furthermore, with respect to the third read request, the memory control unit 122 receives at T12 the third internal read-request signal from the CPU interface 121. At this time, however, since the memory unit 130 is still busy taking care of the previous read request, the memory control unit 122 will wait until the memory unit 130 completes the outputting of the third block of data demanded by the previous read request, i.e., until T21, and then start to issue successively a precharge-enable signal, an activate-enable signal, and a read-enable signal to the memory unit 130 for the third read request. In response to these signals, the memory unit 130 first opens the page where the requested data are located; and then, after a latency of two clock cycles after the read-enable signal is received, i.e., at T27, the memory unit 130 starts to output the four blocks of data demanded by the third read request via the MD data line to the memory control unit 122. These data are then transferred via the CPU interface 121 to the CPU 110.

For comparison purpose, the foregoing memory access operation in response to the same three read requests from the CPU 110 is hereunder instead performed by the memory access control system 120 with the CPU interface 121 being switched to the non-waiting mode to compare for the performance difference between the two operation modes.

FIG. 9B shows the signal timing diagram of the memory access operation performed by the memory access control system 120 when the CPU interface 121 is operating in the non-waiting mode in response to the same three read requests from the CPU 110 which are successively issued at T1, T4, and T7 via the ADS and REQ data lines. When the CPU interface 121 receives the first read request from the CPU 110, it promptly issues at T3 the corresponding internal read-request signal via the DADS data line to the memory control unit 122. Subsequently, when the CPU interface 121 receives the second read request from the CPU 110, it promptly issues at T6 the corresponding internal read-request signal via the DADS data line to the memory control unit 122 without waiting until the CPU 110 issues the L1 write-back signal of the second read request; and next, when the CPU interface 121 receives the third read request from the CPU 110, it promptly issues at T9 the corresponding internal read-request signal via the DADS data line to the memory control unit 122 without waiting until the CPU 110 issues the L1 write-back signal of the third read request.

The memory control unit 122, in response to the first internal read-request signal from the CPU interface 121, first checks that the requested data are located in a closed page in the memory unit 130; and then, after two clock cycles, i.e., at T5, the memory control unit 122 starts to issue successively a precharge-enable signal, an activate-enable signal, and a read-enable signal to the memory unit 130 for the first read request. In response to these signals, the memory unit 130 first opens the page where the requested data are located; and then, after a latency of two clock cycles after the read-enable signal is received, i.e., at T11, the memory unit 130 starts to output the four blocks of data demanded by the first read request via the MD data line to the memory control unit 122. These data are then transferred via the CPU interface 121 to the CPU 110.

With respect to the second read request, the memory control unit 122 receives at T6 the second internal read-request signal from the CPU interface 121 and checks that the requested data are located in another closed page. At this time, however, since the memory unit 130 has not yet completed the read operation for the previous read request, the memory control unit 122 will wait until T13 and then start to issue successively a precharge-enable signal, an activate-enable signal, and a read-enable signal via the CMD data line to the memory unit 130 for the second read request. In response to these signals, the memory unit 130 first opens the page where the requested data are located, and then starts at T19 to output the requested data to the memory control unit 122. These data are then transferred via the CPU interface 121 to the CPU 110.

Furthermore, with respect to the third read request, the memory control unit 122 receives at T9 the third internal read-request signal from the CPU interface 121. At this time, however, since the memory unit 130 is still busy taking care of the previous read request, the memory control unit 122 will wait until the memory unit 130 completes the outputting of the third block of data demanded by the previous read request, i.e., until T21, and then start to issue successively a precharge-enable signal, an activate-enable signal, and a read-enable signal to the memory unit 130 for the third read request. In response to these signals, the memory unit 130 first opens the page where the requested data are located; and then, after a latency of two clock cycles after the read-enable signal is received, i.e., at T27, the memory unit 130 starts to output the four blocks of data demanded by the third read request via the MD data line to the memory control unit 122. These data are then transferred via the CPU interface 121 to the CPU 110.

By comparing FIG. 9B with FIG. 9A, it can be seen that, when the CPU interface 121 is operating in the waiting mode, it requires a total of 32 clock cycles to respond to the three successively issued read requests from the CPU 110. Similarly, in the non-waiting mode, it also requires the same 32 clock cycles to complete. It is apparent that in this case the non-waiting mode is equal in memory access performance to the waiting mode.

Figure 10A:
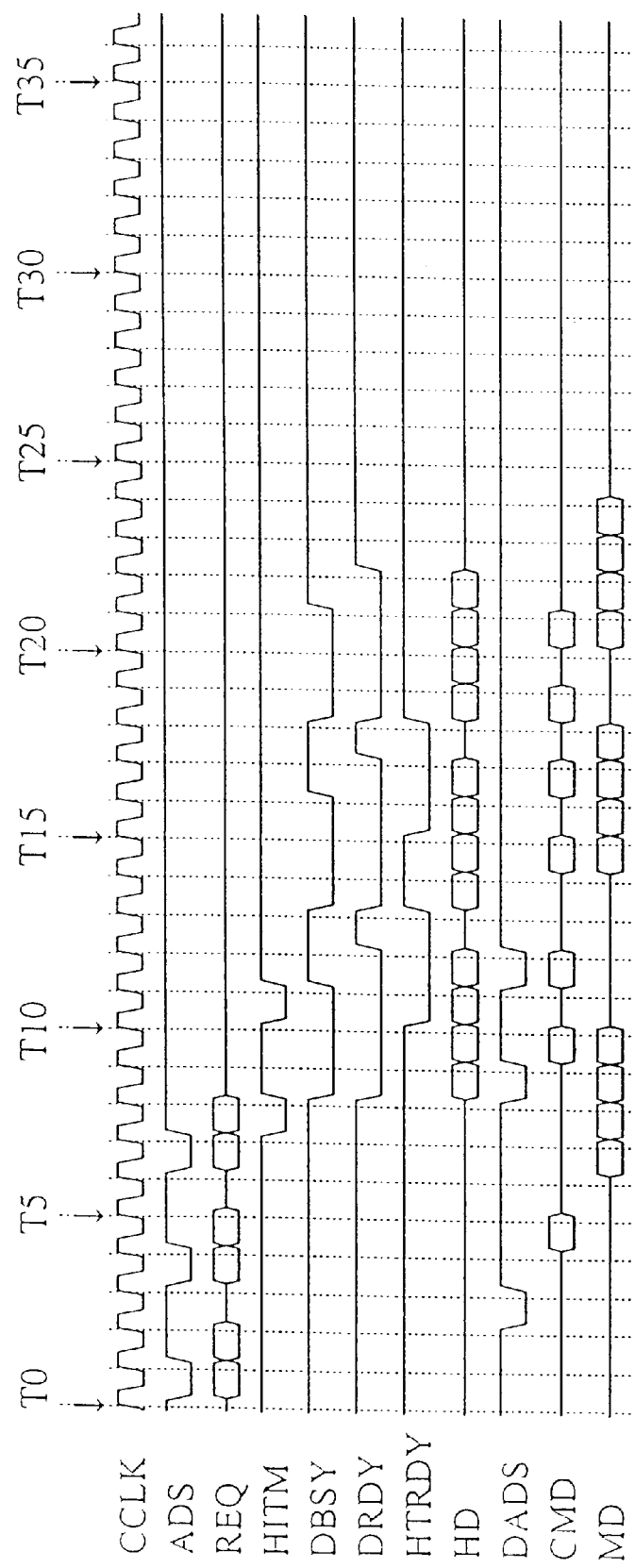
FIG. 10A–10B are two signal timing diagrams of the memory access control system of the invention, which are used to compare for the performance difference between the waiting mode and the non-waiting mode under a sixth assumed condition.
Figure 10B:
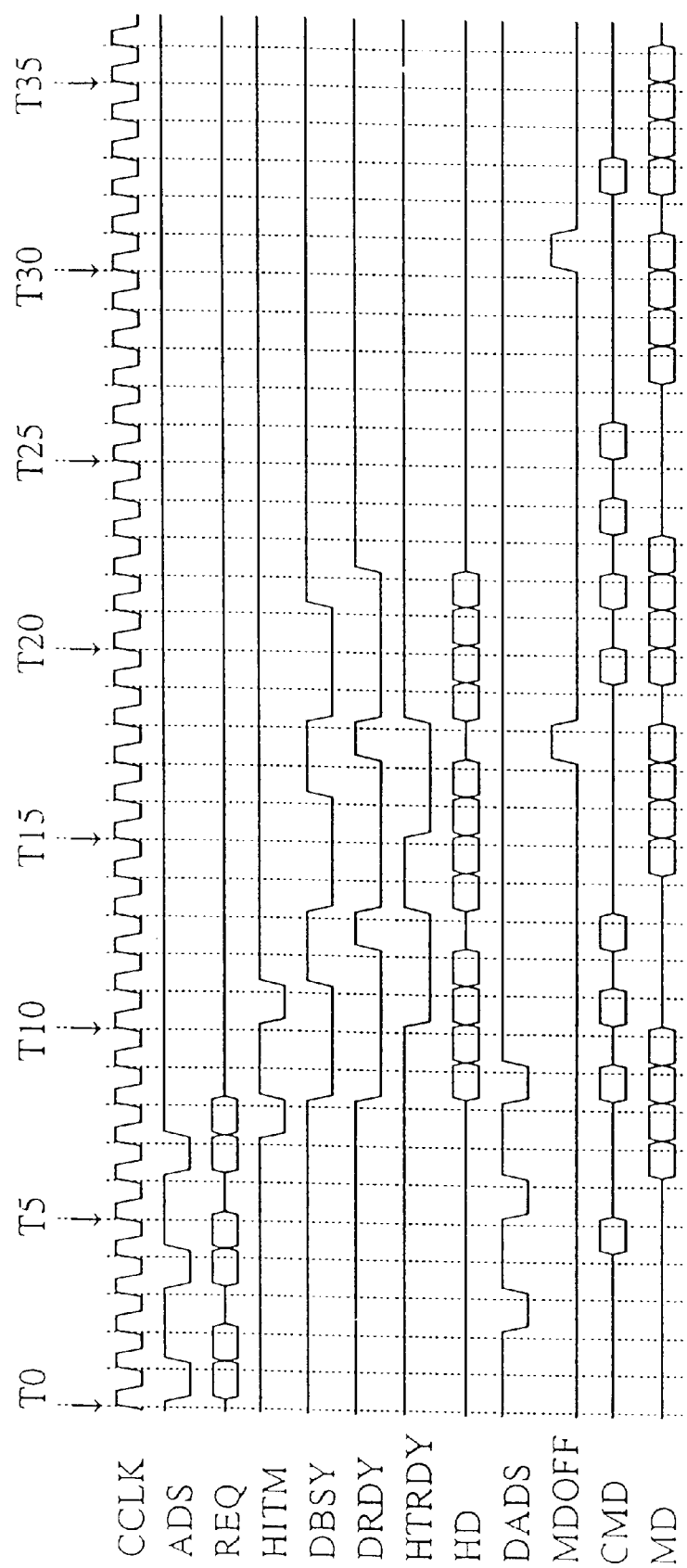

SIXTH PERFORMANCE COMPARISON
EXAMPLE (FIGS. 10A and 10B)

In the example of FIGS. 10A–10B, it is assumed that the CPU 110 issues successively three read requests to the memory unit 130, with the second and third read requests being each a cache hit, and with the data demanded by the first read request being located in the currently opened page and the data demanded by the second and third read requests being located respectively in two different closed pages.

FIG. 10A shows the signal timing diagram of the memory access operation performed by the memory access control system 120 when the CPU interface 121 is operating in the waiting mode in response to the above-mentioned three sorts of read requests from the CPU 110 which are successively issued at T1, T4, and T7 via the ADS and REQ data lines. Since the second and third read requests are each a cache hit, the CPU 110 will issue at T8 the L1 write-back signal of the second read request indicative of a cache hit via the HITM data line, and subsequently output at T14 the cache data of the second read request via the HD data line to the CPU interface 121, which are to be written back to the memory unit 130; and further, the CPU 110 will issue at T11 the L1 write-back signal of the third read request indicative of a cache hit via the HITM data line, and subsequently output at T19 the cache data of the third read request via the HD data line to the CPU interface 121, which are to be written back to the memory unit 130.

When the CPU interface 121 receives the first read request from the CPU 110, it assumes that the first read request is not a cache hit, and therefore promptly issues at T3 the corresponding internal read-request signal to the memory control unit 122 without waiting until the CPU 110 issues the L1 write-back signal of the first read request. Next, in response to the second read request issued at T4, the CPU interface 121 will instead wait four clock cycles until the CPU 110 issues the L1 write-back signal of the second read request from the HITM data line, i.e., until T8, and then, since the L1 write-back signal indicates a cache hit, issue at T9 an internal cache write-back request signal instead of an internal read-request signal to the memory control unit 122. Next, in response to the third read request issued at T7, the CPU interface 121 will also wait four clock cycles until the CPU 110 issues the L1 write-back signal of the third read request from the HITM data line, i.e., until T11, and then, since the L1 write-back signal indicates a cache hit, issue at T12 an internal cache write-back request signal to the memory control unit 122.

The memory control unit 122, in response to the first internal read-request signal from the CPU interface 121, first checks that the requested data are located in the currently opened page in the memory unit 130; and then, after two clock cycles, i.e., at T5, the memory control unit 122 starts to issue a read-enable signal to the memory unit 130. After a latency of two clock cycles, i.e., at T7, the memory unit 130 starts to output the requested four blocks of data via the MD data line to the memory control unit 122. These data are then transferred via the CPU interface 121 to the CPU 110.

With respect to the second read request, the memory control unit 122 receives at T9 the corresponding internal cache write-back request signal from the CPU interface 121. In response, the memory control unit 122 first checks that the write-back cache data are located in a closed page in the memory unit 130; and then at T10, the memory control unit 122 starts to issue successively a precharge-enable signal and an activate-enable signal to the memory unit 130. In response to these signals, the memory unit 130 first opens the page where the write-back cache data are originally located, and then waits until the CPU 110 outputs the cache data of the second read request, i.e., at T14, and then issues at the next clock cycle, i.e., at T15, a write-enable signal to the memory unit 130, causing the output cache data from the CPU 110 to be written back into the memory unit 130.

Furthermore, with respect to the third read request, the memory control unit 122 receives at T12 the corresponding internal cache write-back request signal from the CPU interface 121. At this time, however, since the memory unit 130 is still busy taking care of the cache write-back operation for the previous read request, the memory control unit 122 will wait until the memory unit 130 completes the writing of the third block of the cache data of the second read request, i.e., until T17, and then start to issue successively a precharge-enable signal, an activate-enable signal, and a write-enable signal to the memory unit 130 for the cache write-back operation of the third read request. In response to these signals, the memory unit 130 first opens the page where the cache data of the third read request are originally located, and then writes the output cache data from the CPU 110 back into the memory unit 130.

For comparison purpose, the foregoing memory access operation in response to the same three read requests from the CPU 110 is hereunder instead performed by the memory access control system 120 with the CPU interface 121 being switched to the non-waiting mode to compare for the performance difference between the two operation modes.

FIG. 10B shows the signal timing diagram of the memory access operation performed by the memory access control system 120 when the CPU interface 121 is operating in the non-waiting mode in response to the same three read requests from the CPU 110 which are successively issued at T1, T4, and T7 via the ADS and REQ data lines. When the CPU interface 121 receives the first read request from the CPU 110, it promptly issues at T3 the corresponding internal read-request signal via the DADS data line to the memory control unit 122. Subsequently, when the CPU interface 121 receives the second read request from the CPU 110, it promptly issues at T6 the corresponding internal read-request signals via the DADS data line to the memory control unit 122 without waiting until the CPU 110 issues the L1 write-back signal of the second read request; and next, when the CPU interface 121 receives the third read request from the CPU 110, it promptly issues at T9 the corresponding internal read-request signals via the DADS data line to the memory control unit 122. Since the second and third read requests are each a cache hit, the CPU 110 will issue an L1 write-back signal indicative of a cache hit for each of these read requests after the respective internal read-request signals are issued to the memory control unit 122. When the CPU interface 121 receives the L1 write-back signal of the second read request indicative of a cache hit, it will promptly issue a read-stop signal via the MDOFF data line to the memory control unit 122; and next, when the CPU interface 121 receives the L1 write-back signal of the third read request indicative of a cache hit, it will also promptly issue a read-stop signal via the MDOFF data line to the memory control unit 122.

The memory control unit 122, in response to the first internal read-request signal from the CPU interface 121, first checks that the requested data are located in the currently opened page in the memory unit 130; and then, the memory control unit 122 starts at T5 to issue a read-enable signal to the memory unit 130 for the first read request. In response, the memory unit 130 starts at T7 to output the data demanded by the first read request via the MD data line to the memory control unit 122.

After the memory unit 130 completes the outputting of the third block of data demanded by the first read request, the memory control unit 122 issues successively a precharge-enable signal, an activate-enable signal, and a read-enable signal to the memory unit 130 for the second read request. In response, the memory unit 130 start at T15 to output the four blocks of data demanded by the second read request. However, at the time the memory unit 130 is outputting the last block of data, the memory control unit 122 receives the read-stop signal for the second read request from the CPU interface 121. In response, the memory control unit 122 promptly abandons the currently retrieved data and then issues at T20 a write-enable signal to the memory unit 130, causing the memory unit 130 to write the output cache data from the CPU 110 back into the memory unit 130.

After the memory unit 130 completes the writing of the third block of the cache data of the second read request, i.e., at T22, the memory control unit 122 issues successively a precharge-enable signal, an activate-enable signal, and a read-enable signal to the memory unit 130 for the subsequent third read request. In response, the memory unit 130 starts at T28 to output the four blocks of data demanded by the third read request. However, at the time the memory unit 130 is outputting the last block of data, the memory control unit 122 receives the read-stop signal for the third read request from the CPU interface 121. In response, the memory control unit 122 promptly abandons the currently retrieved data and then issues at T33 a write-enable signal to the memory unit 130, causing the memory unit 130 to write the output cache data from the CPU 110 back into the memory unit 130.

By comparing FIG. 10B with FIG. 10A, it can be seen that, when the CPU interface 121 is operating in the waiting mode, it requires a total of 24 clock cycles to respond to the three successively issued read requests from the CPU 110. By contrast, in the non-waiting mode, it requires an increased 36 clock cycles to complete. It is apparent that in this case the waiting mode is more efficient in memory access performance than the non-waiting mode.

Figure 11A:
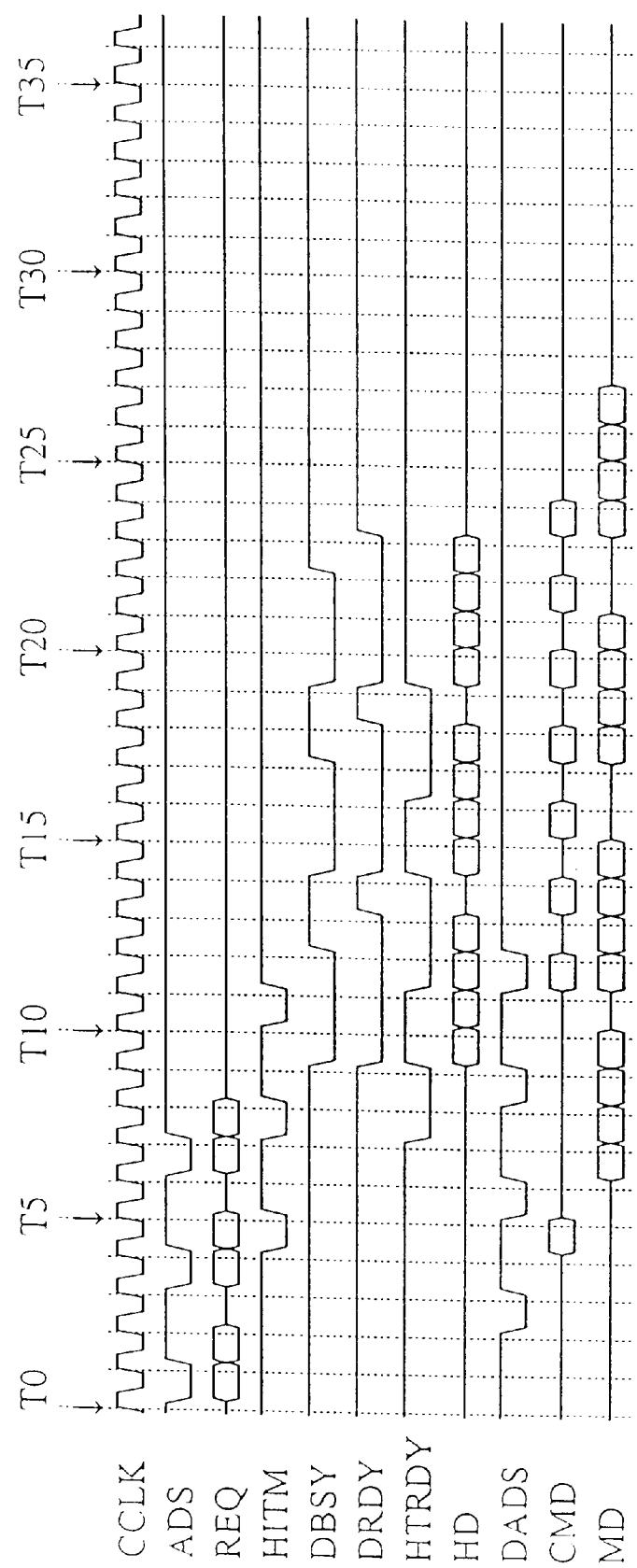
FIG. 11A–11B are two signal timing diagrams of the memory access control system of the invention, which are used to compare for the performance difference between the waiting mode and the non-waiting mode under a seventh assumed condition.
Figure 11B:
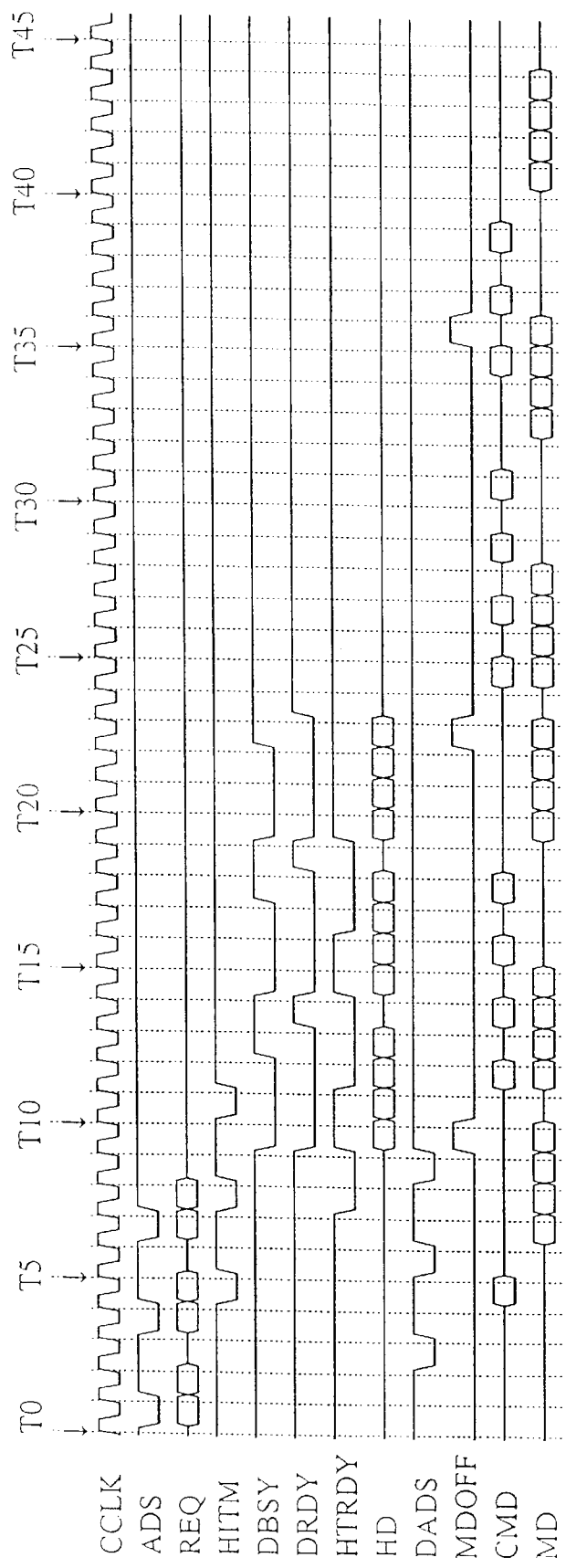

SEVENTH PERFORMANCE COMPARISON EXAMPLE (FIGS. 11A and 11B)

In the example of FIGS. 11A–11B, it is assumed that the CPU 110 issues successively three read requests to read data from the memory unit 130, with all the three read requests being each a cache hit, and with the data demanded by the first read request being located in the currently opened page and the data demanded by the second and third read requests being located respectively in two different closed pages.

FIG. 11A shows the signal timing diagram of the memory access operation performed by the memory access control system 120 when the CPU interface 121 is operating in the waiting mode in response to the above-mentioned three sorts of read requests from the CPU 110 which are successively issued at T1, T4, and T7 via the ADS and REQ data lines. In response to the above-mentioned three cache-hit read requests respectively issued at T1, T4, and T7, the CPU 110 will start at T5 to issue the respective L1 write-back signals of these three read requests, each indicative of a hit to the cache memory 112, via the HITM data line to the CPU interface 121, and after this, output successively at T10, T15, and T20 the respective cache data of the three read requests, which are to be written back to the memory unit 130, via the HD data line to the CPU interface 121.

When the CPU interface 121 receives the first read request from the CPU 110, it assumes that the first read request is not a cache hit, and therefore promptly issues at T3 the corresponding internal read-request signal to the memory control unit 122 without waiting until the CPU 110 issues the L1 write-back signal of the first read request. After this, the CPU interface 121 will receive at T5 the L1 write-back signal indicative of the first read request indicative of a cache hit via the HITM data line from the CPU 110; in response, the CPU interface 121 issues an internal cache write-back request signal for the first read request.

Next, in response to the second read request issued at T4, the CPU interface 121 will wait four clock cycles until the CPU 110 issues the L1 write-back signal of the second read request from the HITM data line, i.e., until T8, and then, since the L1 write-back signal indicates a cache hit, issue at T9 an internal cache write-back request signal for the second read request via the DADS data line to the memory control unit 122. Next, in response to the third read request issued at T7, the CPU interface 121 will also wait four clock cycles until the CPU 110 issues the L1 write-back signal of the third read request from the HITM data line, i.e., until T11, and then, since the L1 write-back signal indicates a cache hit, issue at T12 an internal cache write-back request signal for the third read request via the DADS data line to the memory control unit 122.

The memory control unit 122, in response to the first internal read-request signal from the CPU interface 121, first checks that the requested data are located in the currently opened page in the memory unit 130; and then, after two clock cycles, i.e., at T5, the memory control unit 122 starts to issue a read-enable signal to the memory unit 130. After a latency of two clock cycles after the read-enable signal is received, i.e., at T7, the memory unit 130 starts to output the requested four blocks of data via the MD data line to the memory control unit 122. However, since the first read request is a cache hit, the memory control unit 122 will later receive the internal cache write-back request signal of the first read request. In response, the memory control unit 122 abandons the currently retrieved data and then starts at T12 to issue a write-enable signal to the memory unit 130, causing the memory unit 130 to write the output cache data from the CPU 110 back into the memory unit 130.

With respect to the second read request, the memory control unit 122 receives at T9 the internal cache write-back request signal for the second read request from the CPU interface 121. In response, the memory control unit 122 first checks that the requested data are located in a closed page in the memory unit 130; and then, the memory control unit 122 will wait until the memory unit 130 completes the writing of the third block of the cache data of the previous read request, i.e., until T14, and then start to issue successively a precharge-enable signal, an activate-enable signal, and a write-enable signal to the memory unit 130. In response to these signals, the memory unit 130 first opens the page where the cache data are originally located, and then starts to write the output cache data from the CPU 110 back into the memory unit 130.

Furthermore, with respect to the third read request, the memory control unit 122 receives at T12 the internal cache write-back request signal of the third read request from the CPU interface 121. In response, the memory control unit 122 will wait until the memory unit 130 completes the writing of the third block of the cache data of the previous read request, i.e., until T20, and then start to issue successively a precharge-enable signal, an activate-enable signal, and a write-enable signal to the memory unit 130. In response to these signals, the memory unit 130 first opens the page where the cache data of the third read request are originally located, and then starts to write the output cache data from the CPU 110 back into the memory unit 130.

For comparison purpose, the foregoing memory access operation in response to the same three read requests from the CPU 110 is hereunder instead performed by the memory access control system 120 with the CPU interface 121 being switched to the non-waiting mode to compare for the performance difference between the two operation modes.

FIG. 11B shows the signal timing diagram of the memory access operation performed by the memory access control system 120 when the CPU interface 121 is operating in the non-waiting mode in response to the same three read requests from the CPU 110 which are successively issued at T1, T4, and T7 via the ADS and REQ data lines. When the CPU interface 121 receives the first read request from the CPU 110, it promptly issues at T3 the corresponding internal read-request signal via the DADS data line to the memory control unit 122. Subsequently, when the CPU interface 121 receives the second read request from the CPU 110, it promptly issues at T6 the corresponding internal read-request signals via the DADS data line to the memory control unit 122 without waiting until the CPU 110 issues the L1 write-back signal of the second read request; and next, when the CPU interface 121 receives the third read request from the CPU 110, it promptly issues at T9 the corresponding internal read-request signals via the DADS data line to the memory control unit 122.

Since the three read requests are each a cache hit, each of them will cause an L1 write-back signal indicative of a cache hit to be issued after the corresponding internal read-request signals are issued to the memory control unit 122. When the CPU 110 issues the respective L1 write-back signal of the three read requests, the CPU interface 121 will promptly issue the corresponding read-stop signals respectively at T10, T23, and T36 via the MDOFF data line to the memory control unit 122.

The memory control unit 122, in response to the first internal read-request signal from the CPU interface 121, first checks that the requested data are located in the currently opened page in the memory unit 130; and consequently, the memory control unit 122 starts at T5 to issue a read-enable signal to the memory unit 130. In response, the memory unit 130 starts at T7 to output the data demanded by the first read request via the MD data line to the memory control unit 122. However, at the time the memory unit 130 is outputting the last block of the requested data, the memory control unit 122 receives the read-stop signal for the first read request from the CPU interface 121. In response, the memory control unit 122 abandons the currently retrieved data and then issues at T12 a write-enable signal to the memory unit 130, causing the memory unit 130 to write the output cache data from the CPU 110 back into the memory unit 130.

As the memory unit 130 is writing back the third block of the cache data of the first read request, the memory control unit 122 responds to the second internal read-request signal and accordingly issues successively a precharge-enable signal, an activate-enable signal, and a read-enable signal to the memory unit 130 for the second read request. In response, the memory unit 130 starts at T20 to output the four blocks of data demanded by the second read request. However, at the time the memory unit 130 is outputting the last block of the requested data, the memory control unit 122 receives the read-stop signal for the second read request from the CPU interface 121. In response, the memory control unit 122 abandons the currently retrieved data and then issues at T25 a write-enable signal to the memory unit 130, causing the memory unit 130 to write back the output cache data from the CPU 110 into the memory unit 130.

As the memory unit 130 is writing back the third block of the cache data of the second read request, i.e., at T27, the memory control unit 122 responds to the third internal read-request signal and issues successively a precharge-enable signal, an activate-enable signal, and a read-enable signal to the memory unit 130 for the third read request, which causes the memory unit 130 to output at T33 the four blocks of data demanded by the third read request. However, at the time the memory unit 130 is outputting the last block of the requested data, the memory control unit 122 receives the read-stop signal for the third read request from the CPU interface 121. In response, the memory control unit 122 abandons the currently retrieved data and then issues at T38 a write-enable signal to the memory unit 130, causing the memory unit 130 to write back the output cache data from the CPU 110 into the memory unit 130.

By comparing FIG. 11B with FIG. 11A, it can be seen that, when the CPU interface 121 is operating in the waiting mode, it requires a total of 27 clock cycles to respond to the three successively issued read requests from the CPU 110. By contrast, in the nonwaiting mode, it requires an increased 44 clock cycles to complete. It is apparent that in this case the waiting mode is more efficient in memory access performance than the non-waiting mode.

Conclusion

It has been learned from statistics on computer performance that, during memory access operation, the CPU would issue a consecutive series of cache-miss read requests during a certain period, and later a consecutive series of cache-hit read requests during another period. The invention utilizes this characteristic to provide an improved memory access control method and system which is capable of switching the memory access operation between a waiting mode and a non-waiting mode, in such a manner that the memory access operation is switched to the waiting mode when it is assumed that a consecutive series of cache-hit read requests are being currently issued from the CPU, and to the non-waiting mode when it is assumed that a consecutive series of cache-miss read requests are being currently issued from the CPU. At initialization, the memory access operation is set to the waiting mode and will be switched to the non-waiting mode when it is detected that the number of consecutive cache-miss read requests reaches a preset threshold.

From the foregoing performance comparison examples, it can be learned that the overall memory access performance can be increased by switching between the waiting mode and the non-waiting mode based on the current L1 write-back condition of the read requests from the CPU. This further helps increase the overall system performance of the computer system.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A memory access control system for controlling a memory access operation by a CPU to a memory unit, the CPU being capable of issuing a series of read requests each time the CPU intends to read data from the memory unit and being further capable of issuing a level 1 (L1) write-back signal indicative whether the current read request is a hit or a miss to a cache memory after a first delayed period after the current read request is issued, and in the event that the L1 write-back signal of the current read request indicates a cache hit, issuing a cache write-back request to perform a cache write-back operation to write an output cache data from the CPU back into the memory unit after a second delayed period after the L1 write-back signal is issued;

the memory access control system comprising:

(a) a CPU interface coupled to the CPU, which is capable of being selectively switched to operate between a waiting mode and a non-waiting mode; in the waiting mode, the CPU interface responds to each read request from the CPU in such a manner as to wait until the L1 write-back signal of the current read request is received and then issue a corresponding internal read-request signal if the L1 write-back signal indicates a cache miss, or a corresponding internal cache write-back request signal if the L1 write-back signal indicates a cache hit; and in the non-waiting mode, the CPU interface responds to each read request from the CPU in such a manner that the CPU interface will promptly issue the corresponding internal read-request signal without waiting until the CPU issues the L1 write-back signal of the current read request, and in the event that the subsequently issued L1 write-back signal of the current read request indicates a cache hit, promptly issue a read-stop signal for the current read request;

(b) a memory control unit coupled between the CPU interface and the memory unit, which is capable of performing a read operation on the memory unit in response to each internal read-request signal from the CPU interface, and further in response to the read-stop signal, is capable of abandoning the currently retrieved data from the memory unit demanded by the current read request and then performing the cache write-back operation to write back the subsequent output cache data from the CPU back into the memory unit; and (c) a mode-switching unit coupled between the CPU interface and the CPU, which is initially set to switch the CPU interface to operate in the waiting mode, and is further capable of detecting whether each read request from the CPU is a cache hit or a cache miss and counting the number of consecutive cache-miss read requests to thereby switch the CPU interface to the non-waiting mode when the count reaches a preset threshold.

2. The system of claim 1, wherein the memory unit is an SDRAM.

3. The system of claim 1, wherein the read-stop signal is issued during the time the memory control unit is performing a read operation for the current read request on the memory unit.

4. A memory access control method for controlling a memory access operation by a CPU to a memory unit, the CPU being capable of issuing a series of read requests each time the CPU intends to read data from the memory unit and being further capable of issuing a level 1 (L1) write-back signal indicative whether the current read request is a hit or a miss to a cache memory after a first delayed period after the current read request is issued, and in the event that the L1 write-back signal of the current read request indicates a cache hit, issuing a cache write-back request to perform a cache write-back operation to write an output cache data back from the CPU into the memory unit after a second delayed period after the L1 write-back signal is issued;

the memory access control method comprising:

(1) performing a mode-switching process to switch the memory access operation between a waiting mode and a non-waiting mode; the memory access operation being switched to the waiting mode during the time when the currently issued read requests are each a cache hit, and to the non-waiting mode when the currently issued read requests are each a cache miss;

(2) in the waiting mode, responding to each read request from the CPU until the CPU issues the L1 write-back signal of the current read request; and (3) in the non-waiting mode, promptly responding to each read request from the CPU without waiting until the CPU issues the L1 write-back signal of the current read request.

5. The method of claim 4, wherein the step (1) includes the substeps of:

(1-1) initially setting the memory access operation to the waiting mode; and (1-2) if the number of consecutive cache-miss read requests from the CPU reaches a preset threshold, switching the memory access operation to the non-waiting mode, and subsequently, if any cache-hit read request is issued from the CPU, promptly switching the memory access operation back to the waiting mode.

6. The method of claim 5, wherein the step (2) includes the substeps of:

(2-1) waiting until the L1 write-back signal of the current read request is issued;

(2-2) checking whether the L1 write-back signal of the current read request indicates a cache hit or a cache miss;

(2-3) performing a read operation for the current read request if the L1 write-back signal of the current read request indicates a cache miss; and (2-4) performing the cache write-back operation if the L1 write-back signal of the current read request indicates a cache hit.

7. The method of claim 6, wherein the step (3) includes the substeps of:

(3-1) promptly performing the read operation for the current read request without waiting until the CPU issues the L1 write-back signal of the current read request; and (3-2) in the event that the subsequently issued L1 write-back signal of the current read request indicates a cache hit, promptly issuing a read-stop signal for the current read request to abandon the currently retrieved data from the memory unit, and then performing the cache write-back operation to write back the subsequent output cache data from the CPU into the memory unit.

* * * * *